(12) United States Patent
Yanai et al.

(10) Patent No.: US 8,922,856 B2
(45) Date of Patent: Dec. 30, 2014

(54) IMAGE PROCESSING APPARATUS, IMAGE FORMING APPARATUS, AND CONTROL METHOD THEREOF FOR PRINTING BASED ON CONSTRAINING CONDITION INFORMATION

(75) Inventors: Tomokazu Yanai, Yokohama (JP); Atsushi Ushiroda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1565 days.

(21) Appl. No.: 12/022,286

(22) Filed: Jan. 30, 2008

(65) Prior Publication Data

US 2008/0186348 A1 Aug. 7, 2008

(30) Foreign Application Priority Data

Feb. 1, 2007 (JP) .................................. 2007-023516

(51) Int. Cl.
| | | |
|---|---|---|
| H04N 1/46 | (2006.01) | |
| H04N 1/40 | (2006.01) | |
| H04N 1/60 | (2006.01) | |
| G06K 15/10 | (2006.01) | |
| H04N 1/405 | (2006.01) | |

(52) U.S. Cl.
CPC .............. H04N 1/405 (2013.01); G06K 15/107 (2013.01)
USPC .............................. 358/534; 358/2.1; 358/1.9

(58) Field of Classification Search
USPC ......................... 358/3.05, 3.07, 1.8
See application file for complete search history.

(56) References Cited

U.S. PATENT DOCUMENTS

| | | | | |
|---|---|---|---|---|
| 4,974,067 A | * | 11/1990 | Suzuki et al. .................. | 358/534 |
| 6,081,349 A | * | 6/2000 | Ebitani et al. ................. | 358/3.19 |
| 6,164,745 A | | 12/2000 | Nagoshi et al. | |
| 6,364,446 B1 | | 4/2002 | Ishikawa et al. | |
| 6,511,143 B1 | | 1/2003 | Ishikawa et al. | |
| 6,669,318 B2 | | 12/2003 | Ushiroda | |
| 7,207,650 B2 | | 4/2007 | Ikemoto et al. | |
| 2004/0125410 A1 | * | 7/2004 | Shirata et al. .................. | 358/2.1 |
| 2006/0170937 A1 | * | 8/2006 | Takahashi ...................... | 358/1.8 |
| 2008/0192267 A1 | | 8/2008 | Watanabe | |
| 2008/0316554 A1 | | 12/2008 | Yanai et al. | |

FOREIGN PATENT DOCUMENTS

| | | |
|---|---|---|
| JP | 6336016 A | 12/1994 |
| JP | 2000-103088 | 4/2000 |
| JP | 2000141714 A | 5/2000 |
| JP | 2001063014 A | 3/2001 |

OTHER PUBLICATIONS

Office Action—Japanese Patent Appln. No. 2007-023516, Japanese Patent Office, Apr. 8, 2011.

* cited by examiner

*Primary Examiner* — Benny Q Tieu
*Assistant Examiner* — Sunil Chacko
(74) *Attorney, Agent, or Firm* — Fitzpatrick, Cella, Harper & Scinto

(57) ABSTRACT

In order to form a high-quality image, upon execution of multi-pass printing using a printing head with a plurality of nozzles, an image processing apparatus calculates, using a scan duty setting unit (105), scan duty data for respective nozzles for each scan of the printing head in accordance with input image data. A halftone processor (108) generates a dot pattern to be formed by applying N-ary processing. The constraining condition information is set so that the phase of spatial frequencies of a next dot pattern to be generated has an opposite phase relationship in a low frequency region with respect to the already printed dot pattern.

23 Claims, 32 Drawing Sheets

F I G. 6
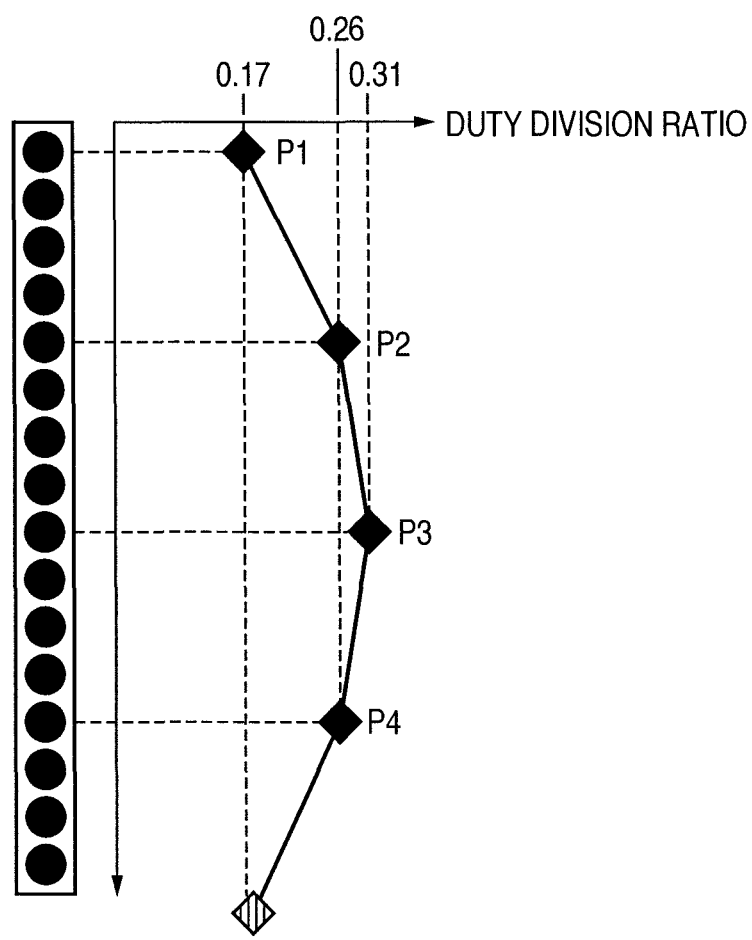

F I G. 13
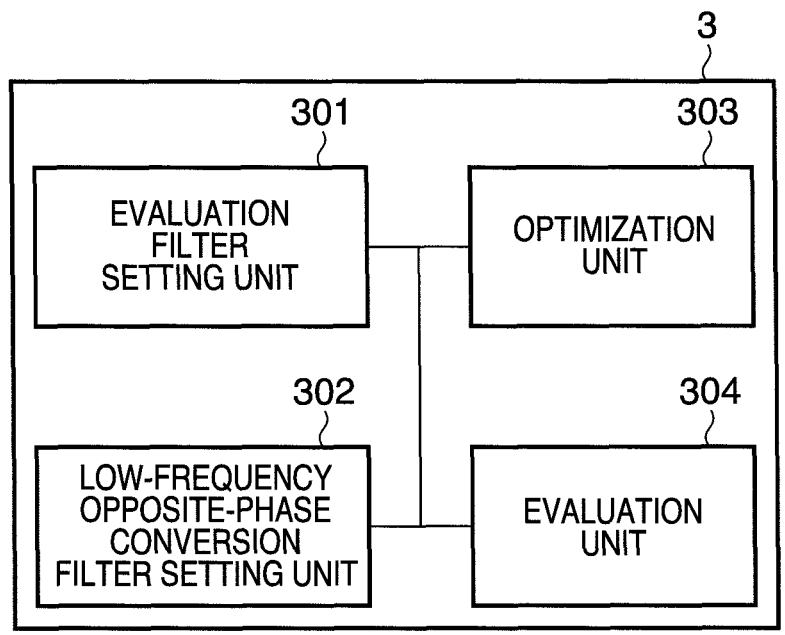

F I G. 18
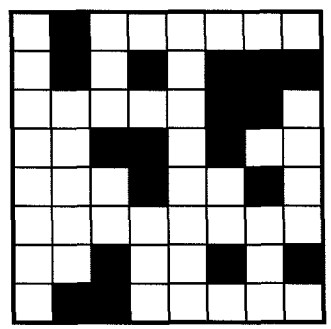

FIG. 20
VERTICAL CROSSOVER
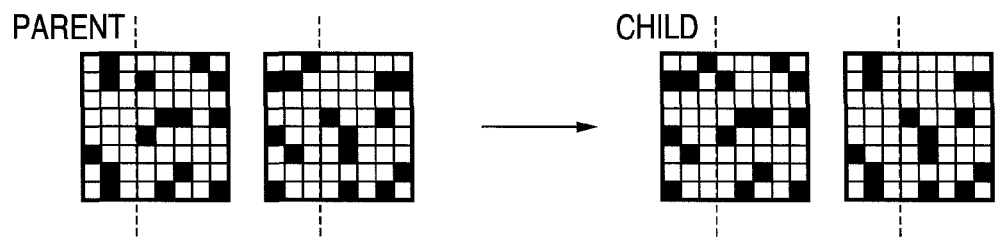
HORIZONTAL CROSSOVER
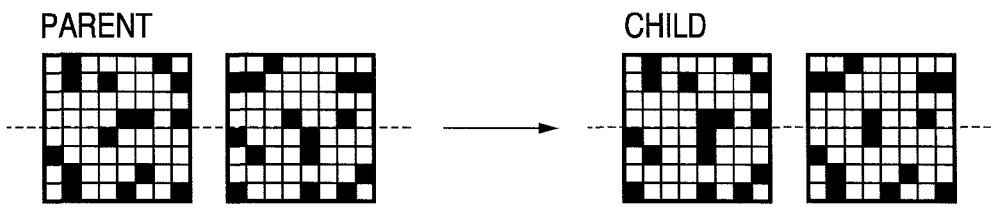

F I G. 21
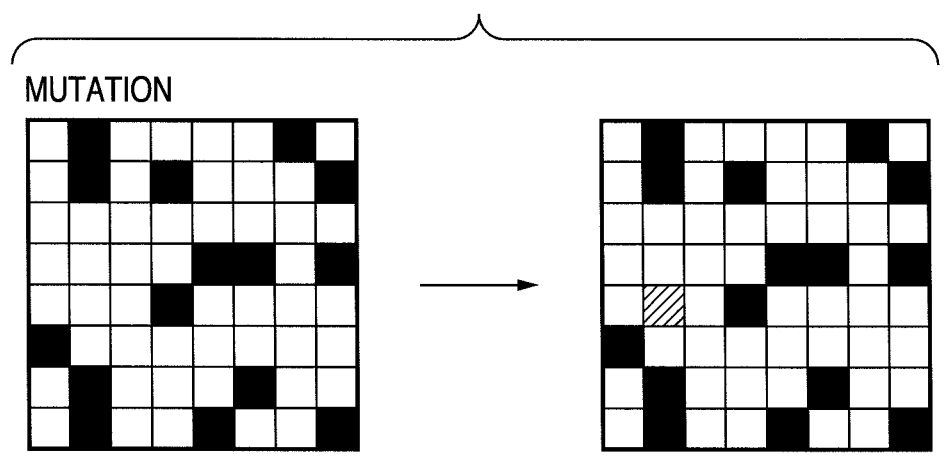

F I G. 26
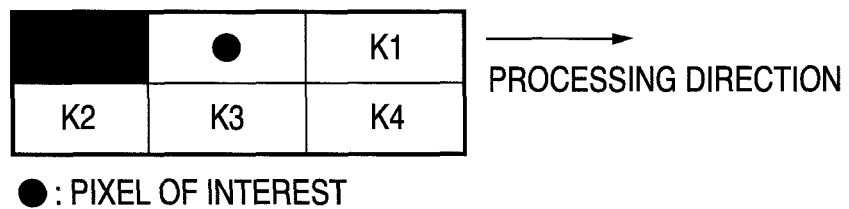

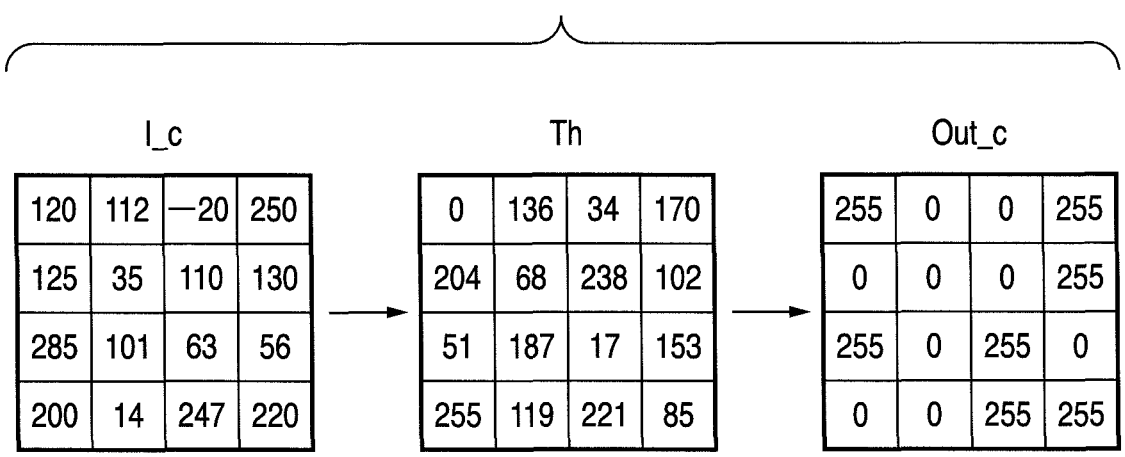
F I G. 32

IMAGE PROCESSING APPARATUS, IMAGE FORMING APPARATUS, AND CONTROL METHOD THEREOF FOR PRINTING BASED ON CONSTRAINING CONDITION INFORMATION

BACKGROUND OF THE INVENTION

1. Field of the Invention

The present invention relates to an image processing apparatus, image forming apparatus, and control method thereof and, more particularly, to an image processing apparatus, image forming apparatus, and control method thereof, which form an image using the number of tones smaller than that of an input image.

2. Description of the Related Art

As image output apparatuses for wordprocessors, personal computers, facsimile apparatuses, and the like, printing apparatuses which print information of desired text, images, and the like on sheet-like printing media such as paper sheets, films, and the like are used. Such printing apparatuses adopt various printing schemes. Of these schemes, schemes for forming an image on a printing medium by attachment of printing agents are popularly put into practical use. As a representative example of such schemes, an ink-jet printing scheme is known.

A printing apparatus, which adopts the ink-jet printing scheme, comprises a nozzle group prepared by integrally arraying a plurality of ink ejection ports (nozzles) that can eject ink with an identical color and density, so as to attain improvement of the printing speed and higher image quality. Furthermore, in order to attain higher image quality, some printing apparatuses comprise a nozzle group which can eject ink with an identical color but different densities, and a nozzle group which can eject ink with an identical color and density by changing an ejection amount in some levels.

In such printing apparatus, as a scheme for converting multi-valued input image data into a binary (or N-ary: N is an integer equal to or larger than 2, which corresponds to the number of tones smaller than that of the input image data) image as a dot printing signal, an error diffusion method is known. According to the error diffusion method, pseudo tone expression is implemented by diffusing a binary error (or an N-ary error) produced at a given pixel to a plurality of subsequent pixels.

In addition to the aforementioned error diffusion method, as a means for converting multi-valued input image data as a binary (or N-ary) image as a dot recording signal, a dither matrix method is known. According to the dither matrix method, pseudo tone expression is implemented by executing N-ary processing by comparing a threshold matrix prepared in advance with the multi-valued input data. Since the dither matrix method requires processing simpler than the error diffusion method, it can achieve higher-speed processing.

In order to improve image quality upon actually forming an image, the number of tones of which has been converted by the error diffusion method or dither matrix method, on a printing medium, a technique for determining the formation order and allocations has been proposed (for example, see Japanese Patent Laid-Open No. 2000-103088 (patent reference 1)). According to this technique, by applying the error diffusion method for each scan, even when registrations of respective scans have varied, an image quality drop due to density nonuniformity can be suppressed. More specifically, a plurality of main scans are made on an identical main scan printing region using different nozzle groups, and a binary (or N-ary) image is formed by the error diffusion method for respective main scans. When a binary (N-ary) images is generated by executing the error diffusion method for respective main scans, the dispersiveness of dot allocations in the main scan becomes high and uniform. Therefore, upon forming an image by a plurality of main scans, even when physical registrations such as the feed amounts of a printing medium, the positions of printing elements, and the like have varied, the graininess hardly changes. Since the dot allocations among the plurality of main scans have low correlation, even when the registrations have varied, a change in dot coverage with respect to the sheet surface is reduced, thus greatly relaxing density nonuniformity.

However, with the scheme described in aforementioned patent reference 1, since the dot allocations among the main scans have low correlation, low frequency components of an image generated by the plurality of scans are unwantedly emphasized. These low frequency components are emphasized more with increasing number of scans, and are recognized as graininess which is visually obtrusive.

The present invention has been made to solve such problems, and has as its object to provide an image forming apparatus having the following functions and a control method thereof. More specifically, by executing N-ary processing (N is an integer equal to or larger than 2) based on predetermined constraining condition information for each main scan, deterioration of graininess depending on low frequency components of an image can be suppressed, and a high-quality image can be formed.

SUMMARY OF THE INVENTION

The present invention has been made in consideration of the aforementioned problems, and has as its object to solve one or more of the aforementioned problems.

According to one aspect of the present invention, an image forming apparatus which forms an image by scanning a printing head, comprising a plurality of printing elements, on a printing medium, comprises: an input unit adapted to input image data; a calculation unit adapted to calculate printing amounts for the respective printing elements for each main scan of the printing head in accordance with the image data; and an N-ary unit adapted to generate a dot pattern to be formed by applying N-ary processing (N is an integer not less than 2) to the printing amounts calculated by the calculation unit based on predetermined constraining condition information, wherein the constraining condition information is set so that a phase of the dot pattern to be generated by the N-ary unit has an opposite phase relationship in a low frequency region with respect to a dot pattern already printed on an identical region on the printing medium.

According to another aspect of the present invention, an image processing apparatus which outputs a dot pattern to an image forming apparatus that forms an image by scanning a printing head, comprising a plurality of printing elements, on a printing medium, comprises: an input unit adapted to input image data; a calculation unit adapted to calculate printing amounts for the respective printing elements for each main scan of the printing head in accordance with the image data; and an N-ary unit adapted to generate a dot pattern to be formed by applying N-ary processing (N is an integer not less than 2) to the printing amounts calculated by the calculation unit based on predetermined constraining condition information, wherein the constraining condition information is set so that a phase of the dot pattern to be generated by the N-ary unit has an opposite phase relationship in a low frequency region with respect to a dot pattern already printed on an identical region on the printing medium.

According to still another aspect of the present invention, a method of controlling an image forming apparatus which forms an image by scanning a printing head, comprising a plurality of printing elements, on a printing medium, comprises: an input step of causing an input unit to input image data; a calculation step of causing a calculation unit to calculate printing amounts for the respective printing elements for each main scan of the printing head in accordance with the image data; and an N-ary step of causing an N-ary unit to generate a dot pattern to be formed by applying N-ary processing (N is an integer not less than 2) to the printing amounts calculated in the calculation step based on predetermined constraining condition information, wherein the constraining condition information is set so that a phase of the dot pattern to be generated by the N-ary unit has an opposite phase relationship in a low frequency region with respect to a dot pattern already printed on an identical region on the printing medium.

According to yet another aspect of the present invention, a method of controlling an image processing apparatus which outputs a dot pattern to an image forming apparatus that forms an image by scanning a printing head, comprising a plurality of printing elements, on a printing medium, comprises: an input step of causing an input unit to input image data; a calculation step of causing a calculation unit to calculate printing amounts for the respective printing elements for each main scan of the printing head in accordance with the image data; and an N-ary step of causing an N-ary unit to generate a dot pattern to be formed by applying N-ary processing (N is an integer not less than 2) to the printing amounts calculated in the calculation step based on predetermined constraining condition information, wherein the constraining condition information is set so that a phase of the dot pattern to be generated by the N-ary unit has an opposite phase relationship in a low frequency region with respect to a dot pattern already printed on an identical region on the printing medium.

According to the present invention, by executing N-ary processing based on predetermined constraining condition information for each main scan, deterioration of graininess depending on low frequency components of an image can be suppressed, and a high-quality image can be formed.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 shows an example of duty division ratios held in a scan duty setting LUT according to the embodiment of the present invention;

FIG. 13 is a block diagram showing the arrangement of a constraining condition information calculation unit according to the embodiment of the present invention;

FIG. 18 shows an initial random image example in the optimization processing according to the embodiment of the present invention;

FIG. 20 shows crossing examples in the optimization processing according to the embodiment of the present invention;

FIG. 21 shows a mutation example in the optimization processing according to the embodiment of the present invention;

FIG. 26 shows an example of error diffusion coefficients according to the embodiment of the present invention;

FIG. 32 shows an overview of dither matrix processing according to the second embodiment.

DESCRIPTION OF THE EMBODIMENTS

The preferred embodiments of the present invention will be described in detail hereinafter with reference to the accompanying drawings. Note that the arrangements to be described in the following embodiments are merely examples, and the present invention is not limited to the illustrated arrangements.

First Embodiment

Figure 1:
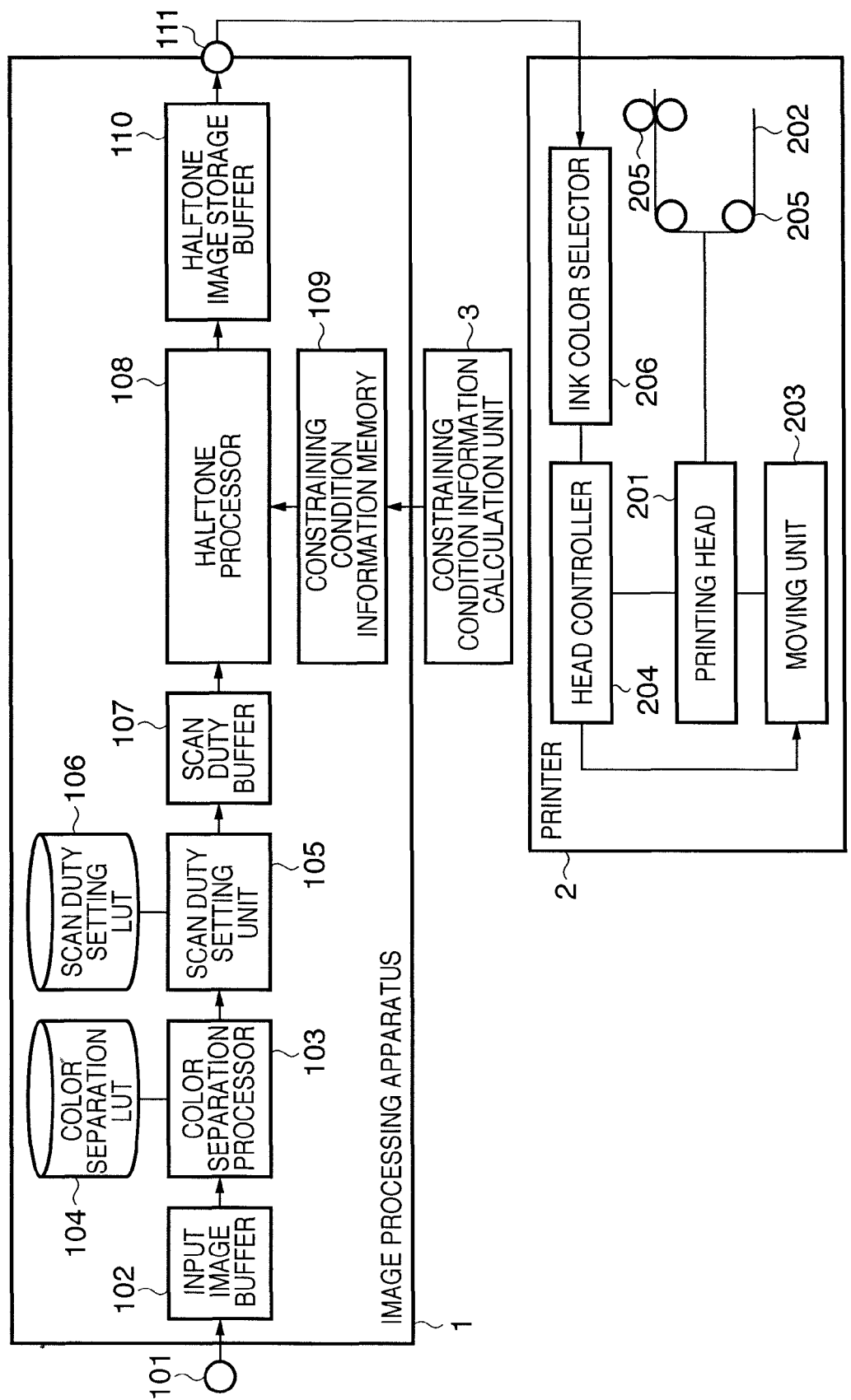
FIG. 1 is a block diagram showing the arrangement of an image forming system according to one embodiment of the present invention.

FIG. 1 is a block diagram showing the arrangement of an image forming system according to this embodiment. Referring to FIG. 1, reference numeral 1 denotes an image processing apparatus; 2, a printer; and 3, a constraining condition information calculation unit. Note that the image processing apparatus 1 can be implemented by, e.g., a printer driver installed in a general personal computer. In this case, respective units of the image processing apparatus 1 to be described below are implemented when the computer executes a predetermined program. As another arrangement, for example, the printer 2 may include the image processing apparatus 1, or the constraining condition information calculation unit 3 may be included in the image processing apparatus 1.

The image processing apparatus 1 and printer 2 are connected to each other via a printer interface or circuit. The image processing apparatus 1 receives image data to be printed from an image data input terminal 101, and stores it in an input image buffer 102. A color separation processor 103 separates the input image data into ink colors the printer 2 uses. Upon execution of this color separation processing, the processor 103 looks up a color separation lookup table (LUT) 104. A scan duty setting unit 105 further converts ink color values separated by the color separation processor 103 into those for each scan, and stores the converted data in a scan duty buffer 107. Scan duty data in this embodiment indicates a printing ink amount for each scan.

The constraining condition information memory 109 accumulates information indicating whether or not a dot is easily formed at an address on an image to be printed. Note that the constraining condition information memory 109 is assured for each ink color.

A halftone image storage buffer 110 stores binary image data for each color obtained by the halftone processor 108. The binary image data stored in the halftone image storage buffer 110 is output to the printer 2 via an output terminal 111.

The printer 2 forms the binary image data formed by the image processing apparatus 1 on a printing medium 202 by vertically and horizontally moving a printing head 201 relative to the printing medium 202. As the printing head 201, any of heads of a thermal transfer scheme, electrophotography scheme, ink-jet scheme, and the like can be used, and the printing head 201 of any of these schemes has one or more printing elements (nozzles in case of the ink-jet scheme). A moving unit 203 moves the printing head 201 under the control of a head controller 204. A convey unit 205 conveys a printing medium under the control of the head controller 204. An ink color selector 206 selects an ink color from those mounted in the printing head 201 based on the binary image data for respective colors formed by the image processing apparatus 1.

The constraining condition information calculation unit 3 calculates, in advance, constraining condition information, which is a characteristic feature of this embodiment and is referred to upon execution of binarization processing, by optimization, and sets the calculated constraining condition information in the constraining condition information memory 109. Details of the constraining condition information calculation processing will be described later.

Figure 2:
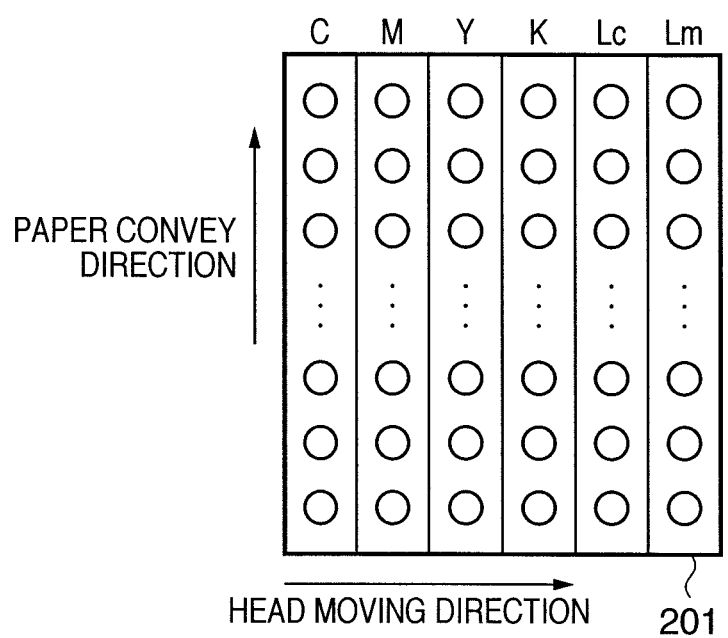
FIG. 2 shows a configuration example of a printing head in a printer according to the embodiment of the present invention.

FIG. 2 shows a configuration example of the printing head 201. In this embodiment, the printing head 201 mounts inks of six colors including light cyan (Lc) and light magenta (Lm) having relatively low ink densities in addition to inks of four colors, i.e., cyan (C), magenta (M), yellow (Y), and black (K).

Note that FIG. 2 shows the configuration in which nozzles line up in the paper convey direction for the sake of simplicity. However, the number and layout of nozzles are not limited to this example. For example, the head may have nozzle arrays which eject identical ink in different amounts or a plurality of nozzle arrays which eject ink in an identical amount, or nozzles may be laid out in a zigzag pattern. In FIG. 2, as for the layout order of ink colors, the ink colors line up in the head moving direction. Alternatively, the ink colors may line up in the paper convey direction.

Figure 3:
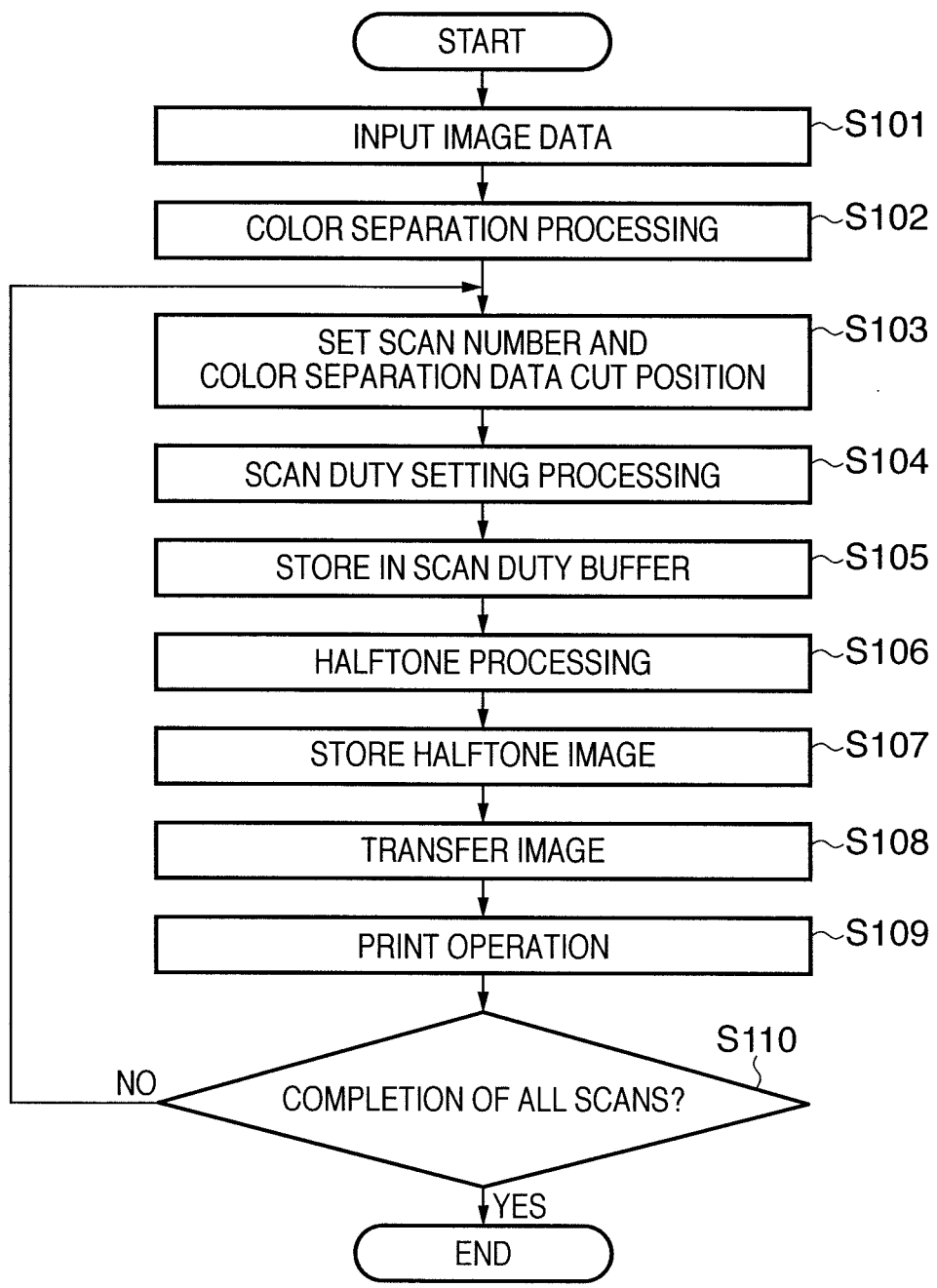
FIG. 3 is a flowchart showing image forming processing according to the embodiment of the present invention.

The image forming processing in the image processing apparatus 1 of this embodiment with the aforementioned functional arrangement will be described below with reference to the flowchart of FIG. 3.

Multi-tone color input image data is input from the input terminal 101, and is stored in the input image buffer 102 (S101) Note that the input image data includes three color components, i.e., red (R), green (G), and blue (B) to form color image data.

The color separation processor 103 applies color separation processing from R, G, and B to C, M, Y, K, Lc, and Lm color ink planes to the multi-tone color input image data stored in the input image buffer 102 (S102). In this embodiment, each pixel data after the color separation processing is handled as 8 bits. However, conversion to the number of tones more than 8 bits may be made.

As described above, the printing head 201 of this embodiment has six different ink colors. For this reason, R, G, and B color input image data are converted into image data of a total of six planes, i.e., C, M, Y, K, Lc, and Lm planes. That is, image data of six different planes corresponding to six different ink colors are generated.

Details of the color separation processing of this embodiment will be described below with reference to FIG. 4.

Figure 4:
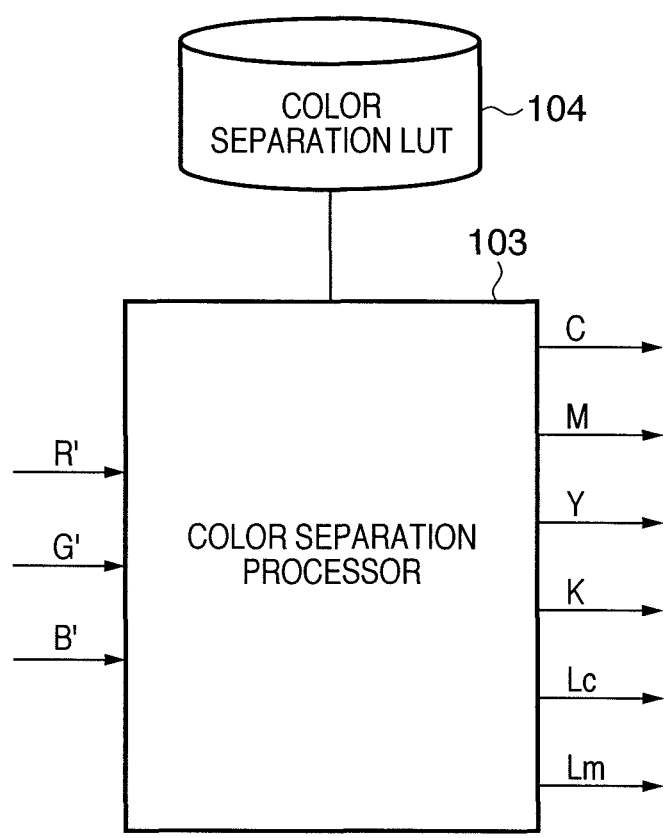
FIG. 4 shows details of input and output data in a color separation processor according to the embodiment of the present invention.

FIG. 4 shows details of input and output data in the color separation processor 103. As shown in FIG. 4, input image data R', G', and B' are converted into C, M, Y, K, Lc, and Lm data by looking up the color separation LUT 104, as given by:

$$C = C\_LUT\_3D(R', G', B') \quad (1)$$

$$M = M\_LUT\_3D(R', G', B') \quad (2)$$

$$Y = Y\_LUT\_3D(R', G', B') \quad (3)$$

$$K = K\_LUT\_3D(R', G', B') \quad (4)$$

$$Lc = Lc\_LUT\_3D(R', G', B') \quad (5)$$

$$Lm = Lm\_LUT\_3D(R', G', B') \quad (6)$$

Note that respective functions defined in the right-hand sides of equations (1) to (6) correspond to the contents of the color separation LUT 104. The color separation LUT 104 defines the output values of respective ink colors from the three input values, i.e., red, green, and blue. Since this embodiment comprises six colors C, M, Y, K, Lc, and Lm, the LUT configuration that obtains six output values from the three input values is adopted.

With the aforementioned processing, the color separation processing of this embodiment is complete.

Referring back to FIG. 3, the scan duty setting unit 105 sets a scan number k and Ycut(k) indicating a Y-coordinate as a color separation data cut position (S103). Ycut(k) is the color separation data cut position at the scan number k, and corresponds to a nozzle upper end coordinate. Note that an initial value of scan number k is 1, and is incremented one by one for each processing loop.

The method of setting the color separation data cut position Y-coordinate Ycut will be explained below taking as an example a case of 4-pass printing which uses the head comprising 16 nozzle arrays and forms an image on an identical main scan printing region on an image by four scans.

Figure 5:
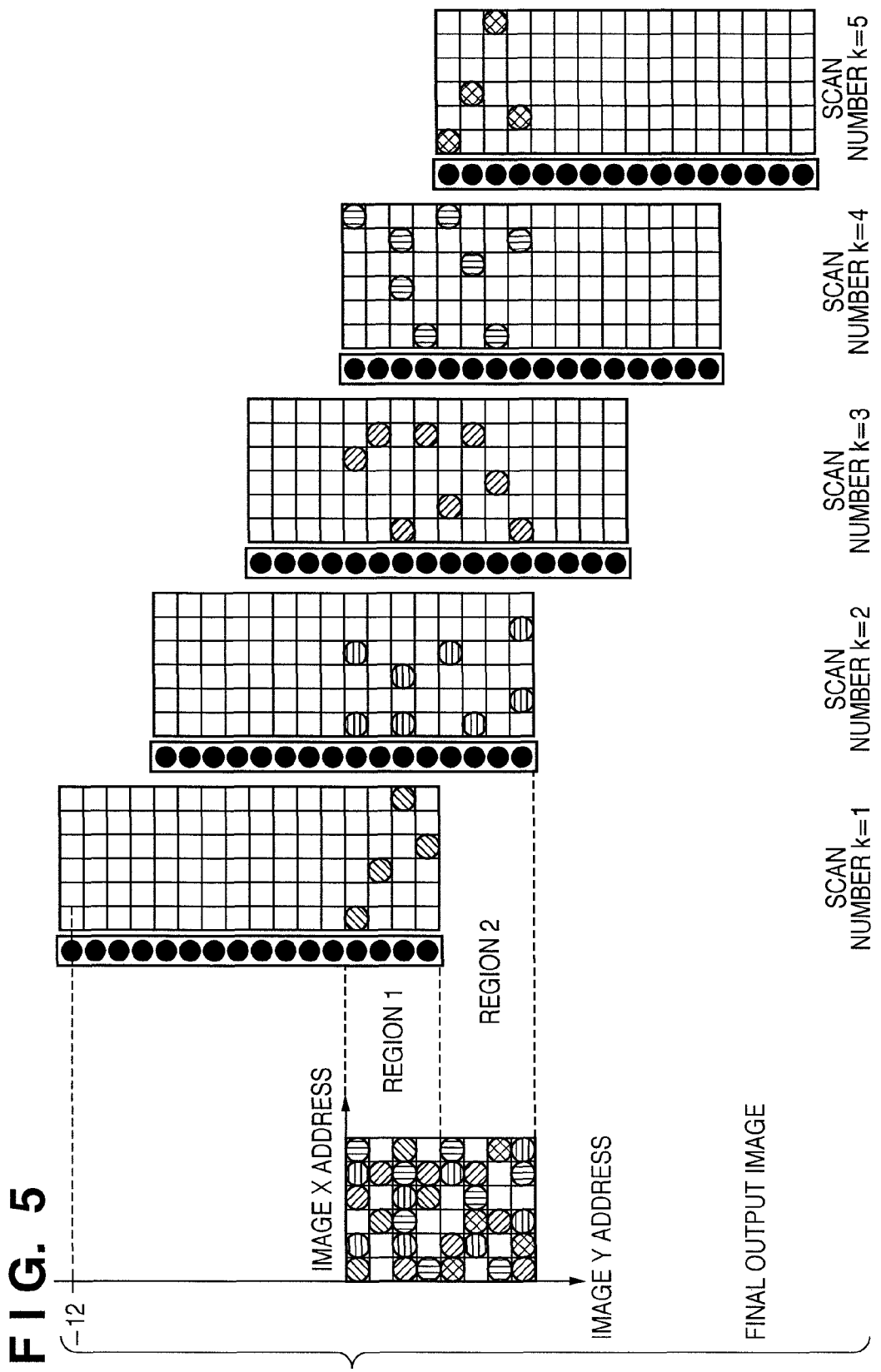
FIG. 5 shows an overview of image formation in a 16-nozzle, 4-pass printing mode according to the embodiment of the present invention.

In general, in case of 4-pass printing, as shown in FIG. 5, an image is formed using only 1/4 nozzle arrays from the lower end at the initial value (k=1) of the scan number, and an image is formed at the scan number k=2 after a paper sheet is fed by a 1/4 nozzle length with respect to the scan number k=1. Furthermore, an image is formed at the scan number k=3 after the sheet is fed by another ¼ nozzle length with respect to the scan number k=2. By repeating such image formation and paper feed, a final output image is formed. For example, in case of the scan number k=1, a color separation data cut position Ycut=−12 corresponding to a nozzle upper end coordinate is set.

Upon normalizing the aforementioned color separation data cut position Ycut(k), Ycut(k) is given by:

$$Ycut(k) = -Nzzl + (Nzzl/Pass) \times k \quad (7)$$

where Nzzl is the number of nozzle arrays, Pass is the number of passes, and k is the scan number.

After Ycut(k) is set as described above, the scan duty setting unit 105 sets duty values for respective scans based on the scan duty setting LUT 106 and image data of the respective color separation processing planes (S104).

According to the scan duty setting LUT 106, values shown in FIG. 6 are given in case of 4-pass printing. FIG. 6 shows an example of 16-nozzle, 4-pass printing. In FIG. 6, the ordinate plots the nozzle position, and the abscissa plots a Duty division ratio. As shown in FIG. 6, inflection points P1 to P4 are set for every four nozzles, and Duty division ratios for 16 nozzles obtained by linearly interpolating the values at these inflection points are held as the scan duty setting LUT 106. Note that numerical values of P1 to P4 are set as follows:

$$P1 + P2 + P3 + P4 = 1.0 \quad (8)$$

Note that the values held as the scan duty setting LUT 106 are not limited to those set by the aforementioned setting method. For example, more inflection points may be set, or values may be directory set for respective nozzles.

Figure 7:
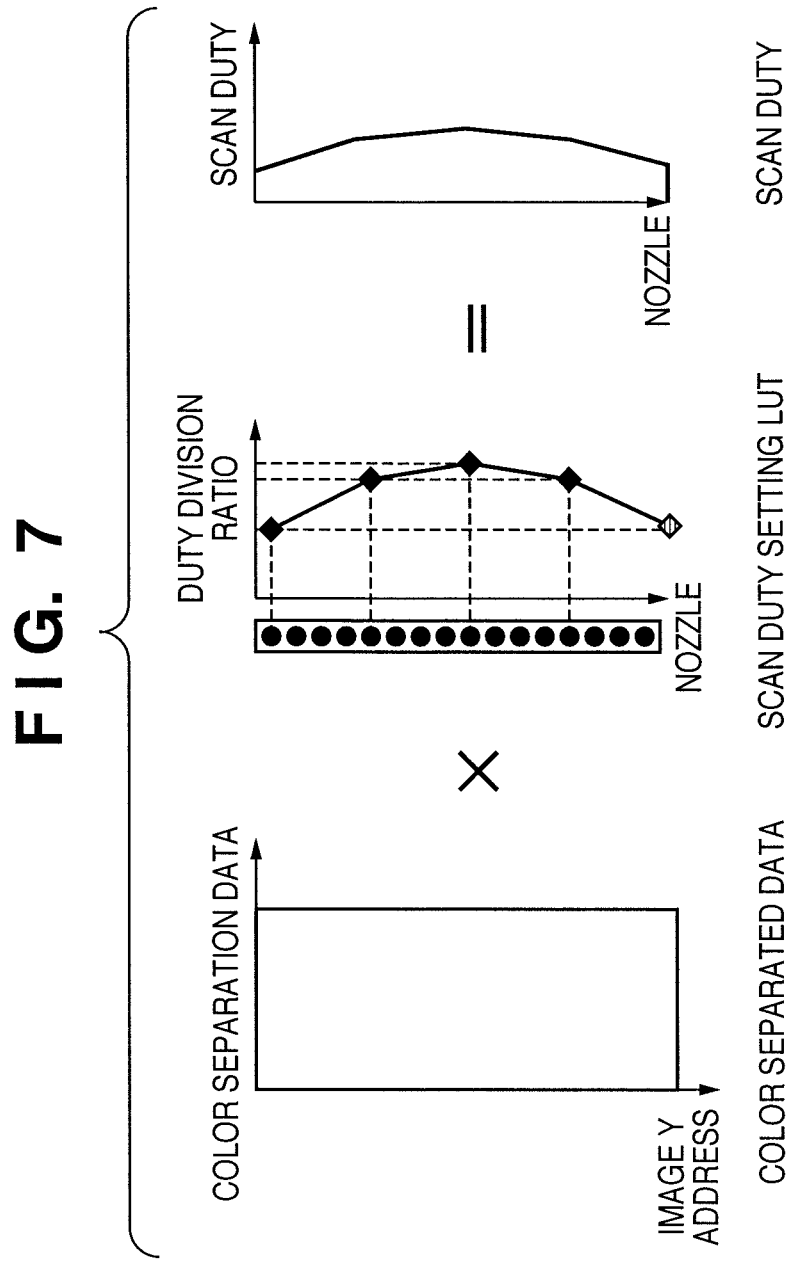
FIG. 7 shows an overview of a scan duty setting method according to the embodiment of the present invention.

The scan duty values to be set in step S104 are set as the products of the scan duty setting LUT 106 and color separation data, as shown in FIG. 7. That is, when data after color separation are multiplied by duty division ratios set for respective nozzles, as shown in the left-hand term of FIG. 7, the products are set as the scan duty values for respective nozzles, as shown in the right-hand term of FIG. 7. In this way, in case of an actual scan, each nozzle ejects ink by an amount corresponding to only the scan duty value with respect to color separation data as a target, thus forming an image.

Figure 8:
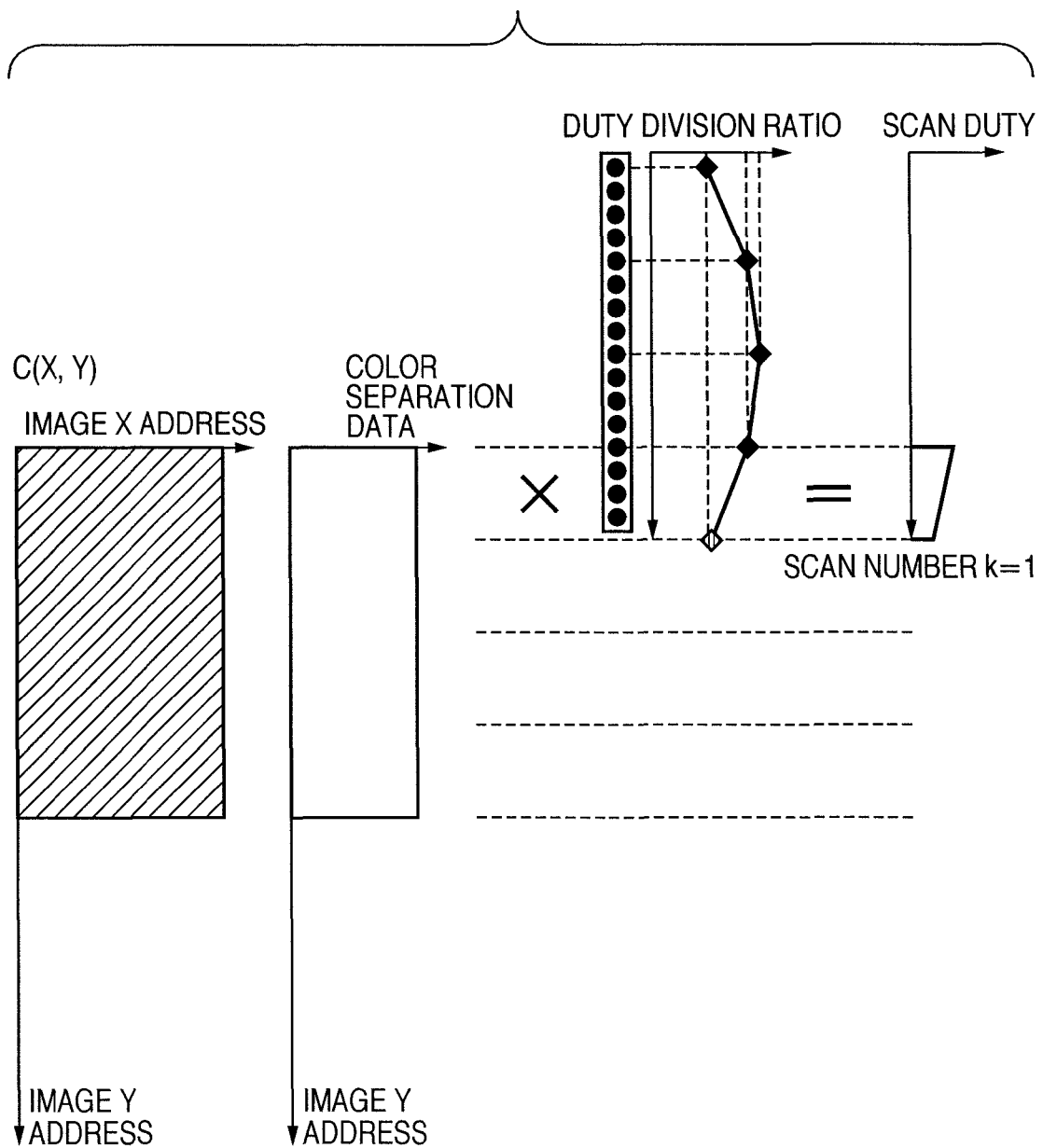
FIG. 8 shows an overview of a scan duty setting method according to the embodiment of the present invention.

In this embodiment, when a corresponding nozzle is located at a coordinate outside the region of image Y addresses, a scan duty value is set to be zero. For example, at the scan number k=1, since 3/4 nozzle arrays from the upper end have negative image Y addresses, as shown in FIG. 8, a scan duty value=0 is substituted, and significant values are substituted in 1/4 nozzle arrays from the lower end.

Figure 9:
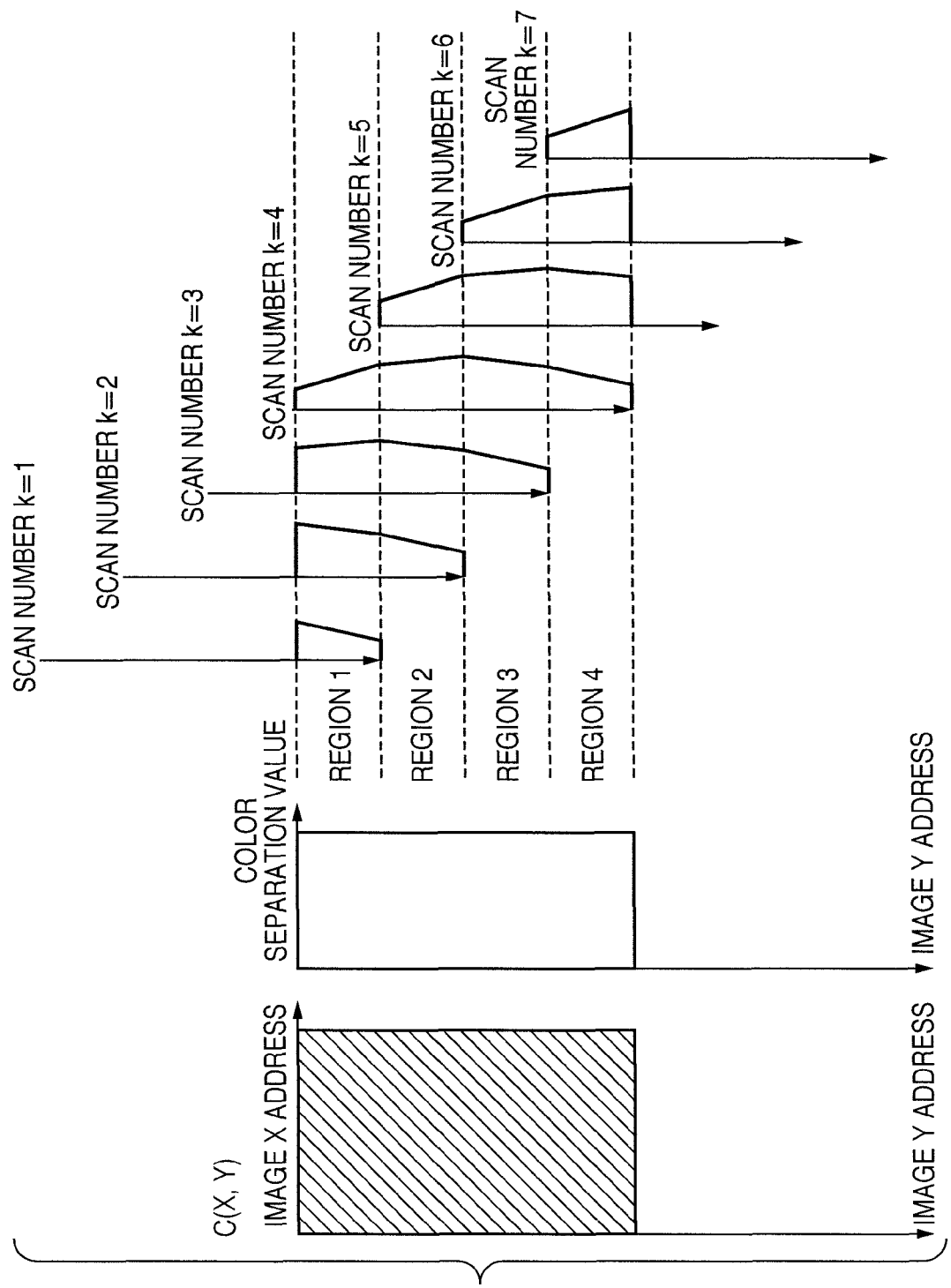
FIG. 9 shows an overview of a scan duty setting method according to the embodiment of the present invention.

Since the color separation data cut position Ycut(k) is determined by the scan number k, in case of scan numbers k=1 to 7, the scan duty values are determined, as shown in FIG. 9. FIG. 9 shows scan duty values corresponding to the nozzle positions for respective scan numbers. As can be seen from FIG. 9, different scan duty values are set for respective scan numbers. Since the respective scan duty values in FIG. 9 are defined by the products of the color separation data and the scan duty setting LUT 106, when the products with the LUT are calculated while feeding a paper sheet, a total value per raster formed by the four scans of the scan numbers k=1 to 4 becomes equal to the color separation data in region 1. Likewise, in each of regions 2, 3, and 4 as well, the total value per raster becomes the same as the color separation data.

In this embodiment, the scan duty values are separated, as shown in FIG. 9. A duty separation threshold D_Th3 is prepared in advance, and is compared with color separation data. If the color separation data value is smaller than D_Th3 (corresponding to formulas (10) to (15) to be described later), image formation is made by one to three scans in place of four scans.

The aforementioned scan duty settings in the scan duty setting unit 105 are described by the following formulas while limiting to, e.g., cyan C(X,Y). Note that C_d(X,Y) represents a scan duty at an address (X,Y), and S_LUT(Y) represents the value of the scan duty setting LUT 106 at an address Y. Also, 0≤nx<image x size, and 0≤ny≤Nzzl (the number of nozzle arrays: 16 in this case). Furthermore, as duty separation thresholds, D_Th2 and D_Th1 indicating smaller thresholds (D_Th3>D_Th2>D_Th1) are defined in addition to D_Th3 described above.

When C(nx, Ycut(k)+ny)>D_Th3, $$C\_d(nx,ny) = C(nx, Ycut(k)+ny) \times S\_LUT(ny) \quad (9)$$

When C(nx, Ycut(k)+ny)≤D_Th1,
for "scan numbers k=1, 5, . . . , 4n+1 (n is an integer equal to or larger than 0)", $$C\_d(nx,ny) = C(nx, Ycut(k)+ny) \quad (10)$$

for "scan numbers other than above numbers", $$C\_d(nx,ny) = 0 \quad (11)$$

When C(nx, Ycut(k)+ny)≤D_Th2,
for "scan numbers k=1, 5, . . . , 4n+1" and "scan numbers k=2, 6, . . . , 4n+2", $$C\_d(nx,ny) = C(nx, Ycut(k)+ny)/2 \quad (12)$$

for "scan numbers other than above numbers", $$C\_d(nx,ny) = 0 \quad (13)$$

When C(nx, Ycut(k)+ny)≤D_Th3,
for "scan numbers k=1, 5, . . . , 4n+1" "scan numbers k=2, 6, . . . , 4n+2", and "scan numbers k=3, 7, . . . , 4n+3", $$C\_d(nx,ny) = C(nx, Ycut(k)+ny)/3 \quad (14)$$

for "scan numbers other than above numbers", $$C\_d(nx,ny) = 0 \quad (15)$$

Formula (9) expresses normal duty separation processing, and formulas (10) to (15) express exceptional duty separation processes. When the color separation data value is smaller than D_Th1, image formation is made by one scan, as described in formulas (10) and (11). When the color separation data value is smaller than D_Th2, image formation is made by two scans, as described in formulas (12) and (13). When the color separation data value is smaller than D_Th3, image formation is made by three scans, as described in formulas (14) and (15).

The same applies to Lc(X,Y), M(X,Y), Lm(X,Y), Y(X,Y), and K(X,Y) to attain separation to the scan duty values using the above formulas.

Since this embodiment has been described taking 4-pass printing as an example, the exceptional duty separation processes are set, as described in formulas (10) to (15). Likewise, in case of 8-pass printing as well, duty separation thresholds D_Th1 to D_Th7 need to be set to execute exceptional duty separation processes.

Figure 10:
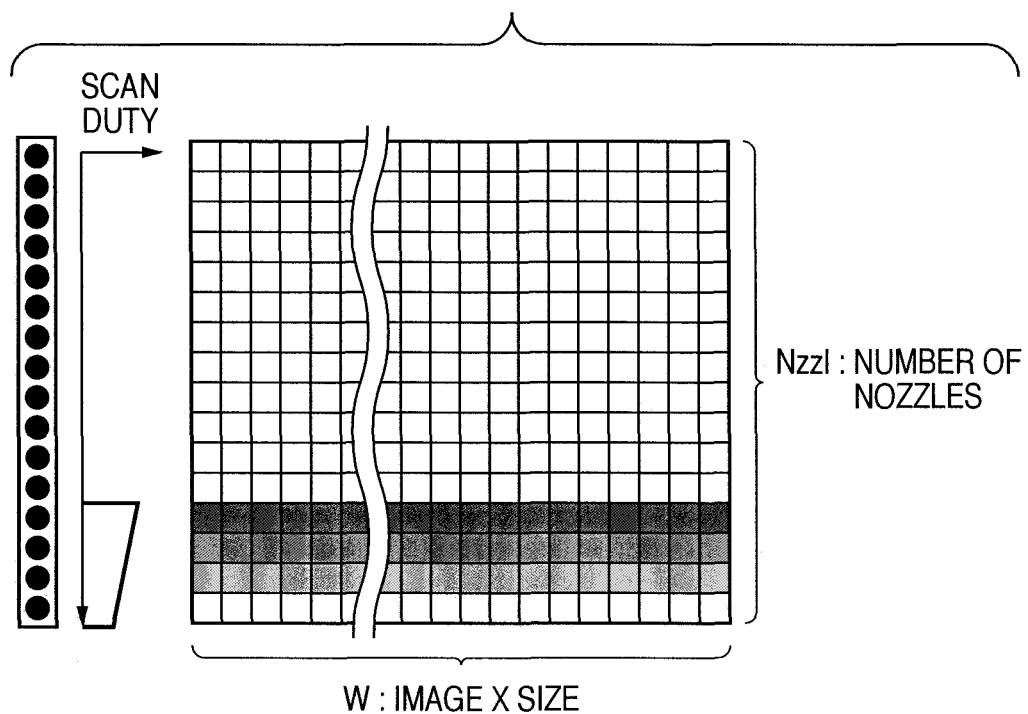
FIG. 10 shows an example of the band configuration of a scan duty buffer according to the embodiment of the present invention.

The scan duty data set by the scan duty setting unit 105 as described above are stored in the scan duty buffer 107 (S105). That is, the scan duty buffer 107 stores, for respective colors, scan duty data values of a band shape, the vertical direction of which corresponds to the number of nozzles and the horizontal direction of which corresponds to the X size of an image, as shown in FIG. 10.

The halftone processor 108 then executes halftone processing for converting the total value of the scan duty data stored in the scan duty buffer 107 and constraining condition information data stored in the constraining condition information memory 109 into a tone value of two levels (binary data) (S106).

Figure 11:
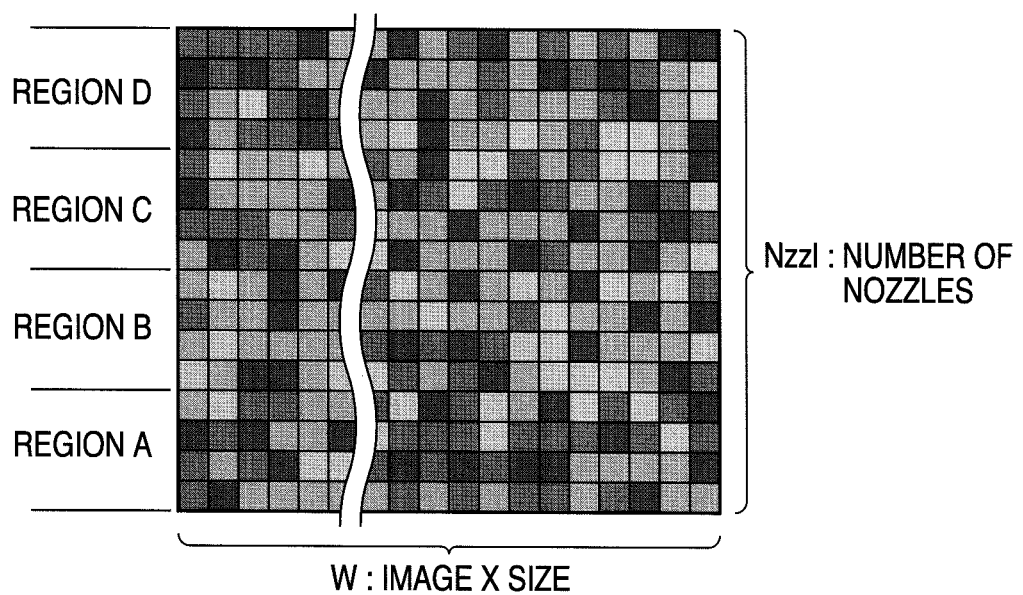
FIG. 11 shows an example of the band configuration of a constraining condition information buffer according to the embodiment of the present invention.

The constraining condition information memory 109 also stores, for each color, band-shaped constraining condition information data values, the vertical direction of which corresponds to the number of nozzles and the horizontal direction of which corresponds to the image X size, as shown in FIG. 11. The constraining condition information memory 109 stores, for each color, constraining condition information indicating whether or not a binary image is easily formed at addresses of an image to be printed. That is, a dot is formed harder at a given position with decreasing value of the constraining condition information, and it is formed easier with increasing value.

The constraining condition information of this embodiment will be described in detail below.

The values of the constraining condition information are set so that their average becomes zero in each of regions A to D shown in FIG. 11. That is, as the constraining condition information, a positive value is set when a dot is easily formed at a position of interest, and a negative value is set when a dot is hardly formed at that position.

Figure 12:
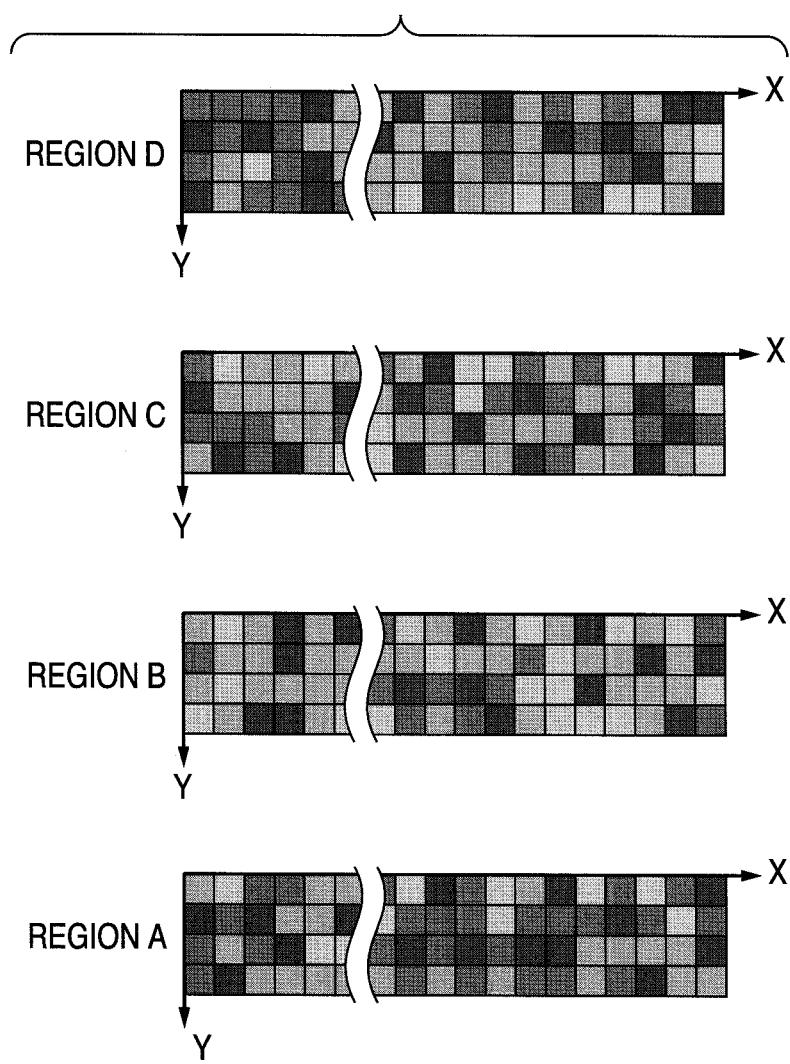
FIG. 12 shows an area division example of a constraining condition information memory according to the embodiment of the present invention.

As a characteristic feature, the constraining condition information of this embodiment is set so that "low frequency components have an opposite phase relationship" and "high frequency components have no correlation" between predetermined regions, as will be described in detail later. For example, as shown in FIG. 12, if regions A to D are respectively represented by Dmn_A(X,Y), Dmn_B(X,Y), Dmn_C(X,Y), and Dmn_D(X,Y), the constraining condition information is set to establish the following relationships between these regions. Assume that the upper left coordinates of regions A to D are (0, 0).

Between regions A and B, low frequency components have an opposite phase relationship, and high frequency components have no correlation.

$$Dmn\_A(X,Y) \Leftrightarrow Dmn\_B(X,Y) \qquad (16)$$

Between regions A+B and C, low frequency components have an opposite phase relationship, and high frequency components have no correlation.

$$Dmn\_A(X,Y)+Dmn\_B(X,Y) \Leftrightarrow Dmn\_C(X,Y) \qquad (17)$$

Between regions A+B+C and D, low frequency components have an opposite phase relationship, and high frequency components have no correlation.

$$Dmn\_A(X,Y)+Dmn\_B(X,Y)+Dmn\_C(X,Y) \Leftrightarrow Dmn\_D(X,Y) \qquad (18)$$

Figure 14:
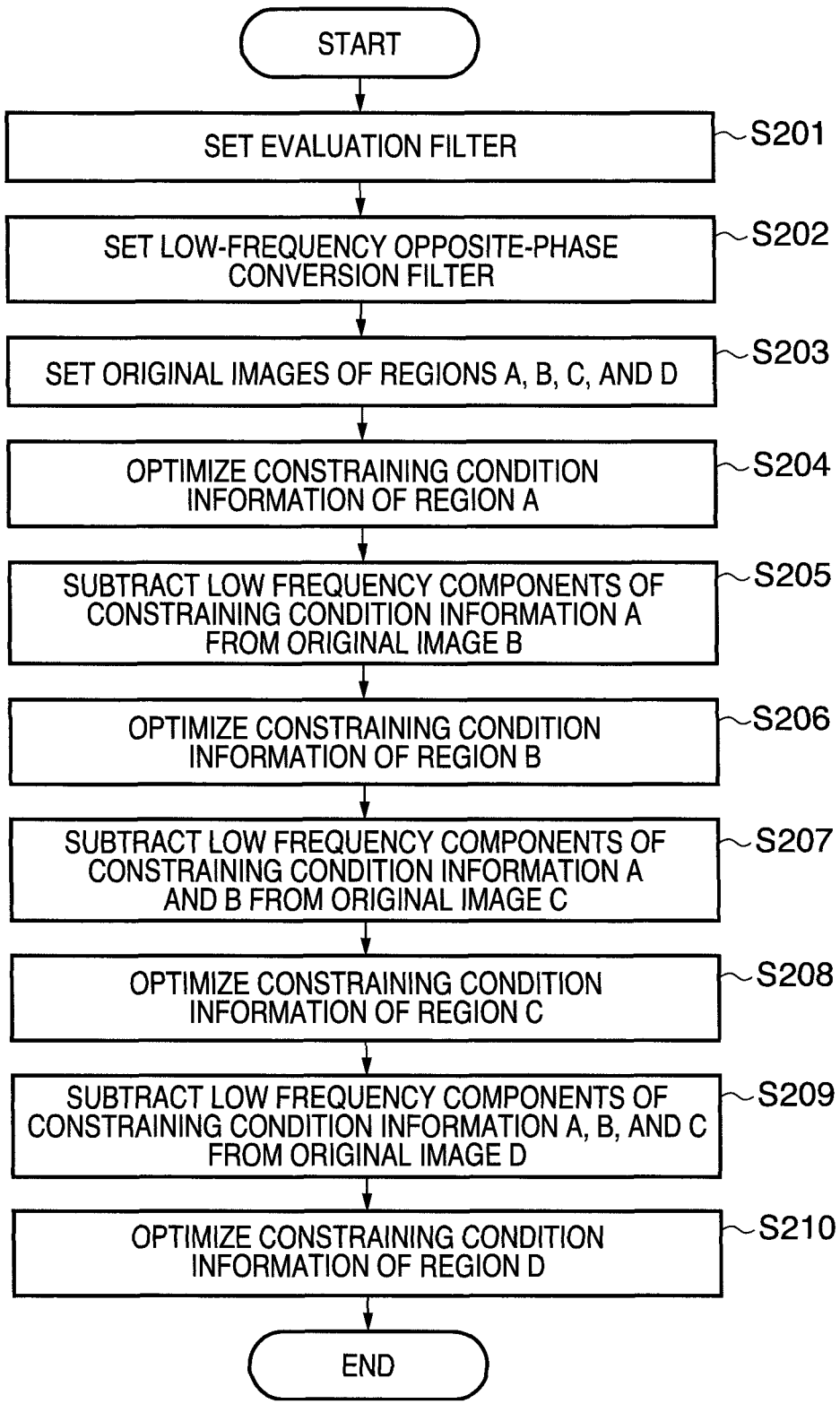
FIG. 14 is a flowchart showing the constraining condition information calculation processing according to the embodiment of the present invention.

The constraining condition information calculation processing of this embodiment will be described in detail below. The constraining condition information of this embodiment is calculated by applying a low-frequency opposite-phase conversion filter LPF_S to constraining condition information calculated by binary image optimization processing. The constraining condition information calculation processing for regions A to D will be described in detail below with reference to the block diagram of FIG. 13 and the flowchart of FIG. 14. FIG. 13 is a block diagram showing the arrangement of the constraining condition information calculation unit 3, and FIG. 14 is a flowchart showing the calculation processing in the constraining condition information calculation unit 3. Note that the following explanation will be given taking as an example a case in which the printing head 201 comprises 96 nozzle arrays and performs 4-pass printing for the sake of descriptive convenience of optimization blocks of constraining condition information to be described later. However, an arrangement having the aforementioned 16 nozzles or other numbers of nozzles can similarly set the constraining condition information.

In step S201 in FIG. 14, an evaluation filter setting unit 301 sets an evaluation filter F_E. Finally, an image obtained by applying the evaluation filter F_E to a binary image after optimization becomes the constraining condition information of this embodiment. That is, the evaluation filter F_E determines the spatial frequency characteristics of the constraining condition information.

The evaluation filter F_E may be any of a low-pass type, band-stop type, and band-pass type, but it is a filter different from the low-frequency opposite-phase conversion filter LPF_S to be described later.

In step S202, a low-frequency opposite-phase conversion filter setting unit 302 sets the low-frequency opposite-phase conversion filter LPF_S. The low-frequency opposite-phase conversion filter LPF_S is used in calculations for setting low frequency components of a predetermined region in opposite phase, as given by formulas (16) to (18). The calculations for setting low frequency components in opposite phase will be described later. This embodiment will explain the low-frequency opposite-phase conversion filter LPF_S as a low-pass filter having a cutoff frequency=10 [cycles/mm]. However, the cutoff frequency is not limited to this example, and may be further lower or higher.

Figure 15:
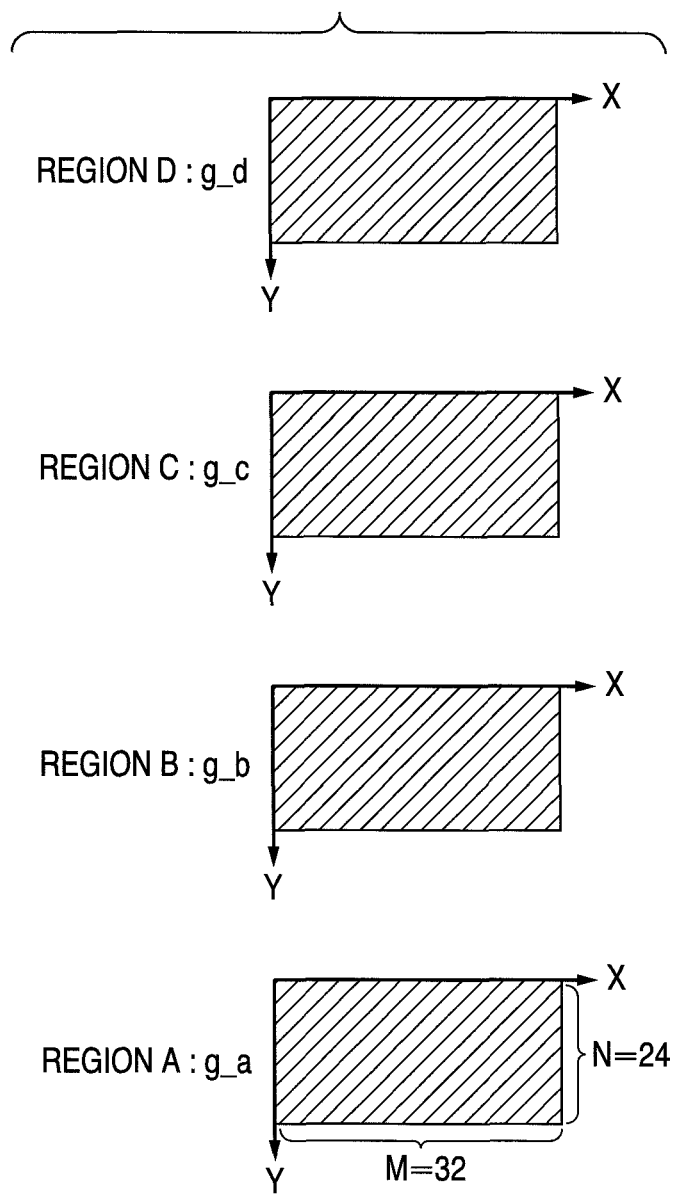
FIG. 15 shows original image examples for respective regions of the constraining condition information memory according to the embodiment of the present invention.

In step S203, original images for optimization of regions A to D are set. At this time, in order to set an original image of each of regions A to D in case of 4-pass printing and 96 nozzles, an original image of each of regions A to D has the number N of vertical pixels=24, as shown in FIG. 15. Note that the following description will be given under the assumption that the number M of horizontal pixels=32 for the sake of simplicity. Of course, the present invention is not limited to this size. In this embodiment, an 8-bit image of 64 tones (black=0, white=255) is set. However, other tone values may be designated. Let g_a, g_b, g_c, and g_d respectively be the original images of regions A to D.

In step S204, an optimization unit 303 optimizes the constraining condition information of region A. More specifically, the unit 303 minimizes an evaluation value I calculated by an evaluation unit 304. This evaluation value I is calculated from errors of images formed by convoluting the evaluation filter F_E to original image g_a of region A and its binary image b_a, as described by:

$$I = \sum_{X=0}^{L-1} \sum_{Y=0}^{L-1} \frac{1}{L^2} |g\_a(X, Y) - O\_DmnA'(X, Y)| \quad (19)$$

where L is a block size, g_z(X, Y) is an original image of region A, and b_a(X, Y) is a binary image for $$O\_DmnA'(X,Y) = b\_a(X,Y) * F\_E \quad (20)$$

where * indicates a convolution operation. Note that the evaluation function described by equation (19) is merely an example, and other evaluation functions may be applied.

Figure 16:
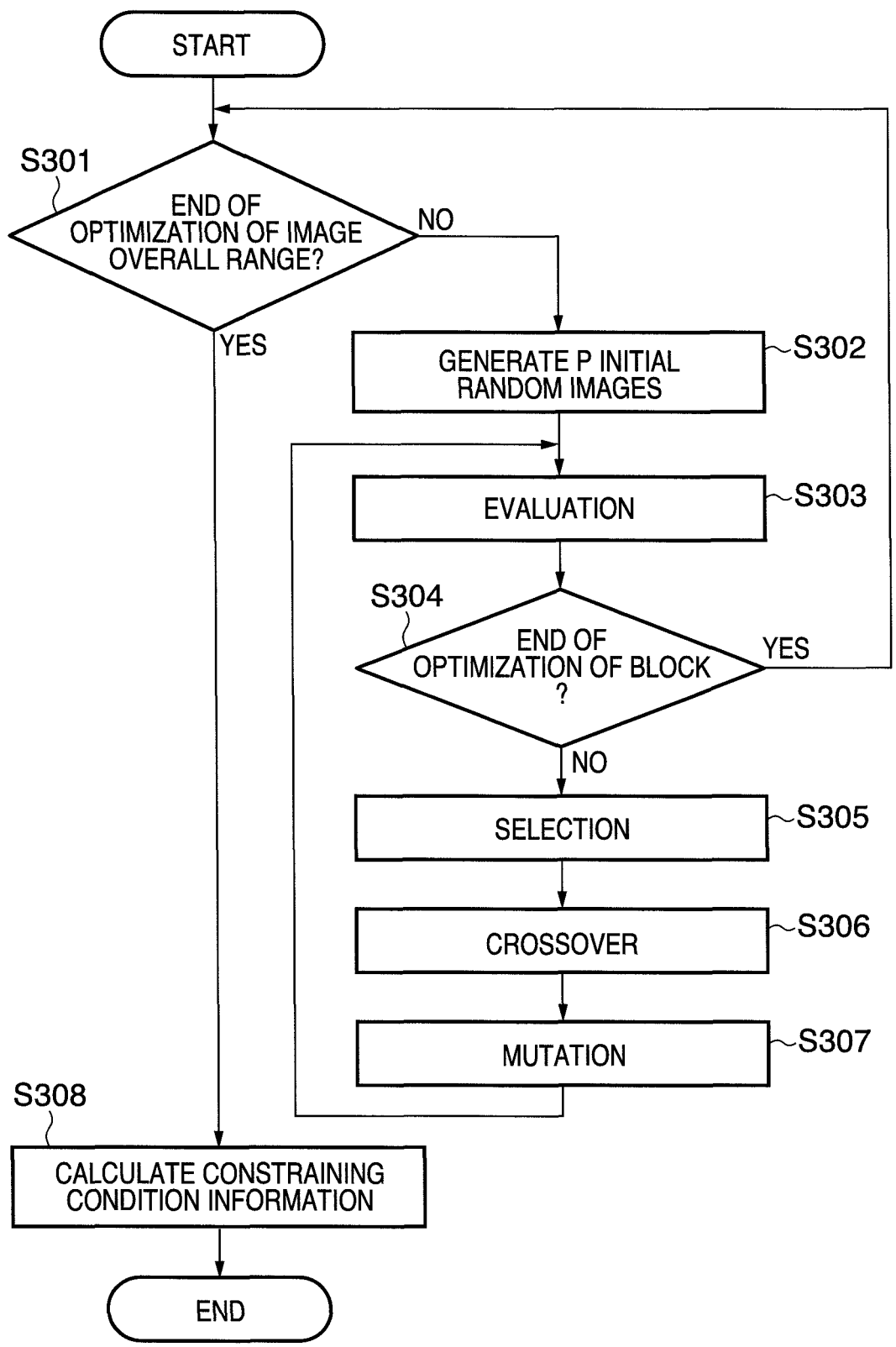
FIG. 16 is a flowchart showing optimization processing of the constraining condition information memory areas according to the embodiment of the present invention.

Optimization in step S204 will be described in detail below with reference to the flowchart of FIG. 16. This embodiment uses a genetic algorithm in optimization of the constraining condition information. However, other optimization algorithms may be applied. Note that the genetic algorithm is known to those who are skilled in the art, and a detailed description thereof will not be given.

Figure 17:
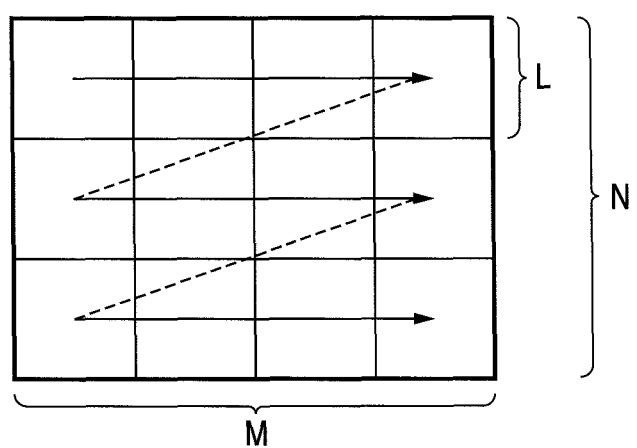
FIG. 17 shows an optimization block size in the optimization processing according to the embodiment of the present invention.

The optimization unit 303 executes optimization processing while dividing an image into small blocks. This is because much time needs to be spent until an optimal solution is found if the size to be optimized is large. Assume that the block size is an aliquot of the size of regions A to D. The following explanation will be given under the assumption that the block size is L×L, and the size of the entire image of the region to be optimized is N×M (N and M are integer multiples of L), as shown in FIG. 17. In this embodiment, L=8, N=24, and M=32. Note that this embodiment will exemplify a case in which the optimization processing is executed in turn from the upper left block, as shown in FIG. 17. However, optimization may be done in other orders.

It is checked in step S301 if optimization of an image overall range (N×M size) is complete. If optimization is complete, the process advances to step S308; otherwise, the process advances to step S302.

In step S302, initial random images for P L×L blocks are generated. Generation of the random images is equivalent to that of P initial populations in the genetic algorithm. Note that a population is that of individuals (chromosomes in the genetic algorithm). FIG. 18 shows an example of an 8×8 initial random image. In FIG. 18, a white pixel corresponds to a chromosome: 1, and a black pixel corresponds to a chromosome: 0.

Figure 19:
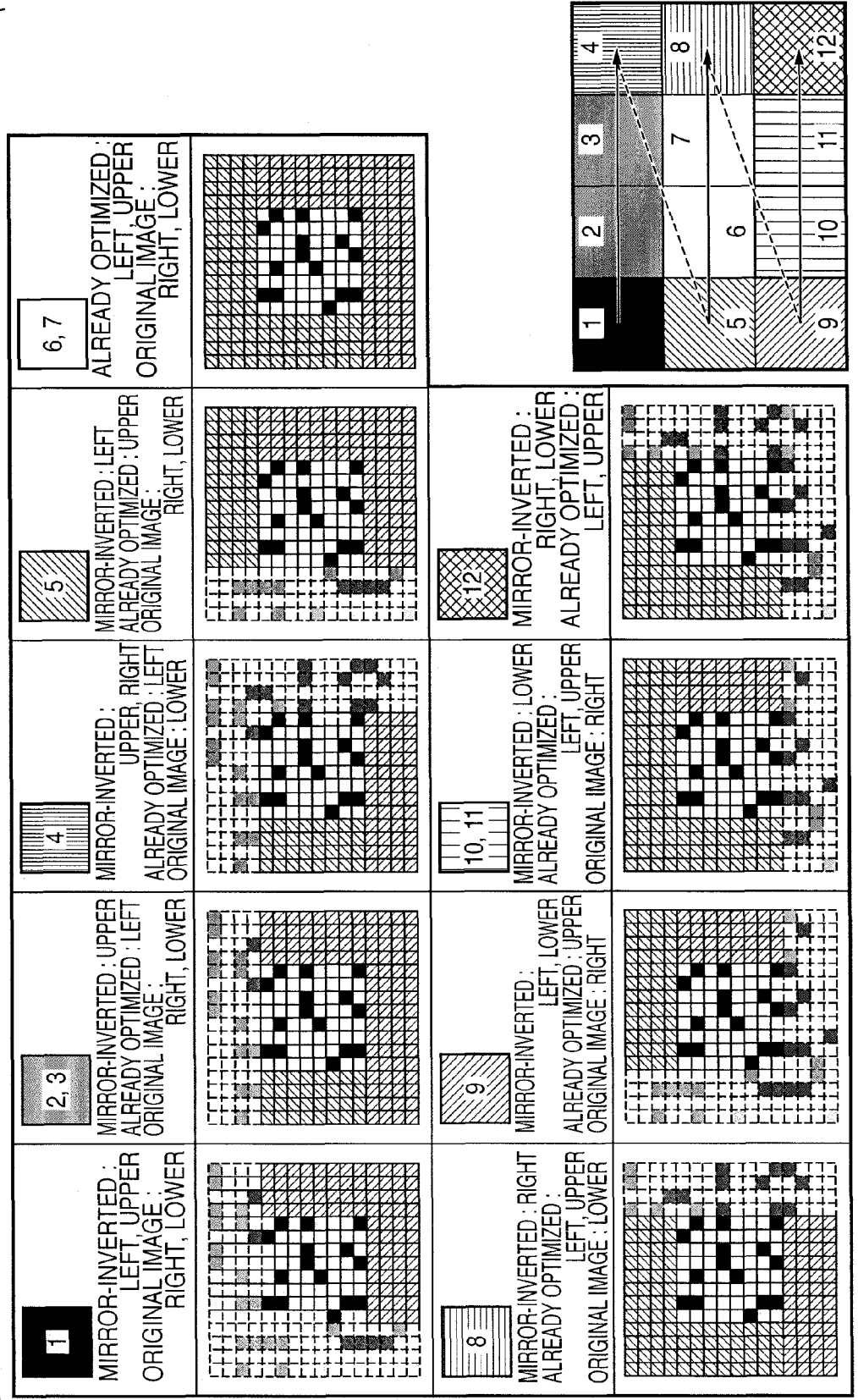
FIG. 19 shows processing examples corresponding to the positions of optimization blocks in the optimization processing according to the embodiment of the present invention.

In step S303, evaluation values I for the P images are calculated. This evaluation requires different evaluation methods depending on the positions of optimization blocks. If optimization is made in turn from the upper left block of an image, as shown in FIG. 17, the way surrounding images are to be handled varies depending on the block positions, as shown in FIG. 19. This is because the convolution processing of the evaluation filter F_E requires extra surrounding pixels. Also, this means that discontinuity is not provided to obtained images.

For example, upon optimizing a block of block number 1 shown in FIG. 19, no already optimized block is available. Therefore, an image (mirror-inverted image) obtained by inverting the block image like a mirror is allocated at the left and upper neighboring positions of the block, and original image g_a is allocated at the right and lower neighboring positions, thus executing convolution.

Upon optimizing a block of next block number 2, the left neighboring block has already been optimized. Therefore, the already optimized image is allocated at the left neighboring position, a mirror-inverted image is allocated at the upper neighboring position, and original image g_a is allocated at the right and lower neighboring positions, thus executing convolution. Note that the already optimized block image and input original image are merely allocated, and their contents are left unchanged during optimization. However, since the mirror-inverted image is that of an image whose optimization is underway, its contents always change during optimization, as a matter of course.

Since the genetic algorithm is an algorithm that searches for an individual with a large fitness, a larger fitness needs to be provided with decreasing evaluation value. For this purpose, a fitness is set, for example, by:

$$F = (Imax - I) + \beta \quad (21)$$

where $\beta$ is a positive constant, and Imax is a maximum evaluation value (the value of an individual with a worst evaluation value) of a population of that generation.

Note that the conversion formula from the evaluation value I to the fitness F is not limited to equation (21), and the fitness F may be increased with decreasing evaluation value I using, e.g., a sigmoid function.

After the evaluation value I is calculated, it is checked in step S304 if optimization of the block image of interest is complete. If optimization is complete, the process advances to step S301 to process the next block; otherwise, the process advances to step S305.

In step S305, a genetic algorithm is selected. Selection of the genetic algorithm is processing for leaving an individual with the large fitness F in the next generation. A roulette rule is set to increase the probability of selection as the fitness F is larger. In addition, selection based on tournament may be made. Note that the roulette rule and tournament are state-of-the-art processes in the genetic algorithm, and a description thereof will not be given.

In step S306, individuals selected in step S305 are crossed at a crossover probability pc (0≤pc≤1). As crossovers, there are vertical and horizontal crossovers, as shown in FIG. 20. The crossover position on each crossover and whether a vertical or horizontal crossover is to be made are randomly switched.

In step S307, each individual is mutated at a mutation probability pm (0≤pm≤1). As this mutation, an operation for inverting a white pixel to a black pixel is made, as shown in FIG. 21. Note that if a pixel of interest is a black pixel, it is inverted to a white pixel. A mutation position is randomly determined. Upon completion of mutation, the process returns to step S303.

On the other hand, in step S308, the evaluation filter F_E is applied to binary image b_a which has undergone optimization, as given by:

$$O\_DmnA(X,Y) = b\_a(X,Y) * F\_E \quad (22)$$

O_DmnA obtained after application of the evaluation filter F_E is a multi-valued (multi-tone) image.

In order to set the average value (DC offset component) of O_DmnA to be zero, an average value Ave_A of O_DmnA is subtracted to calculate final constraining condition information Dmn_A of region A, as given by:

$$Dmn\_A(X,Y) = O\_DmnA(X,Y) - Ave\_A \quad (23)$$

In this manner, optimization of region A in step S204 in FIG. 14 is complete.

In step S205, low frequency components in the constraining condition information of region A are subtracted from original image B. That is, the aforementioned low-frequency opposite-phase conversion filter LPF_S is applied to constraining condition information Dmn_A of region A to calculate low frequency components Dmn_A_F of the constraining condition information of region A, as given by:

$$Dmn\_A\_F(X,Y)=Dmn\_A(X,Y)*LPF\_S \qquad (24)$$

Low frequency components Dmn_A_F of the constraining condition information are subtracted from original image g_b of region B to calculate corrected data g_b' of region B, as given by:

$$g\_b'(X,Y)=g\_b(X,Y)-Dmn\_A\_F(X,Y) \qquad (25)$$

In step S206, the optimization unit 303 optimizes the constraining condition information of region B. More specifically, the unit 303 minimizes the evaluation value I calculated by the evaluation unit 304. This evaluation value I is calculated from errors of images formed by convoluting the evaluation filter F_E to corrected image g_b' of region B and its binary image b_b. Note that the processing in step S206 is the same as that in step S204 described above (i.e., the flowchart in FIG. 16), and a repetitive description thereof will be avoided.

In step S206, final constraining condition information Dmn_B of region B is calculated. At this time, constraining condition information Dmn_A of region A and constraining condition information Dmn_B of region B are calculated. Since Dmn_B is optimized to minimize errors with respect to data from which low frequency components of Dmn_A are subtracted, the low frequency components of Dmn_A and Dmn_B have an opposite phase relationship to each other. Note that the low frequency components of Dmn_A and Dmn_B are 10 [cycles/mm] or less.

Figure 22:
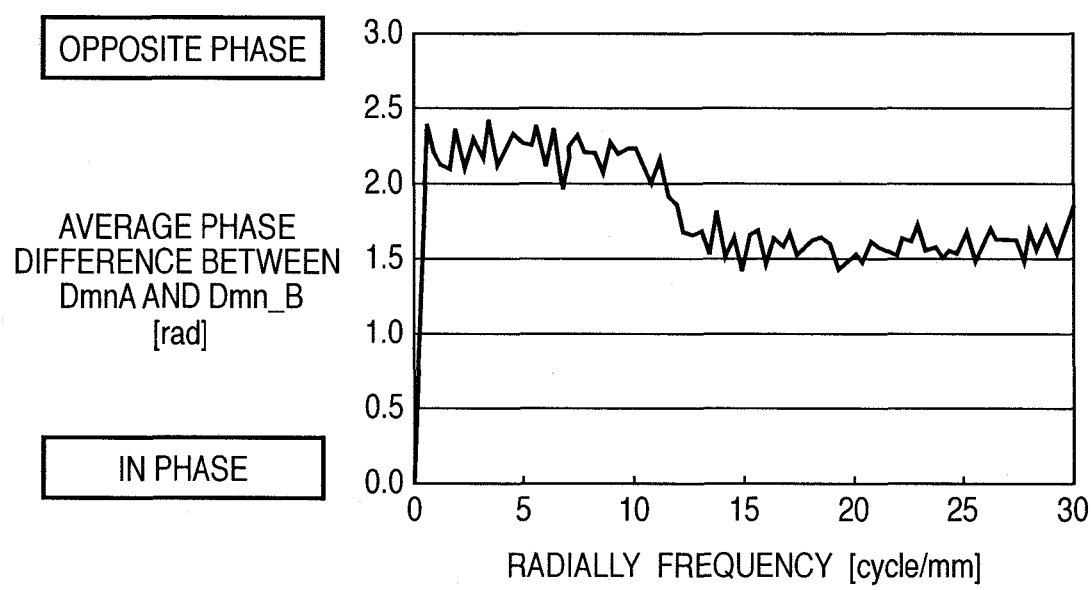
FIG. 22 is a graph showing the phase differences for respective spatial frequencies in the optimization processing according to the embodiment of the present invention.

FIG. 22 shows a graph defined by calculating a cross spectrum between Dmn_A and Dmn_B and calculating phase differences for respective spatial frequencies. FIG. 22 shows the spatial frequencies and the average phase difference relationship between Dmn_A and Dmn_B. As can be seen from FIG. 22, spatial frequencies in a low frequency region equal to or lower than 10 [cycles/mm] have not a perfect opposite phase relationship but assume values close to an opposite phase. Also, as can be seen from FIG. 22, in a high frequency region equal to or higher than 10 [cycles/mm], spatial frequencies assume intermediate values between an opposite phase and in phase, and the phase differences have no correlation. That is, as can be seen from FIG. 22, the relationship defined by formula (16) is satisfied.

In step S207, low frequency components in the constraining condition information of regions A and B are subtracted from original image C. That is, the aforementioned low-frequency opposite-phase conversion filter LPF_S is applied to constraining condition information Dmn_B of region B to calculate low frequency components Dmn_B_F of the constraining condition information of region B, as given by:

$$Dmn\_B\_F(X,Y)=Dmn\_B(X,Y)*LPF\_S \qquad (26)$$

Low frequency components Dmn_A_F and Dmn_B_F of the constraining condition information of regions A and B are subtracted from original image g_c of region C to calculate corrected data g_c' of region C, as given by:

$$g\_c'(X,Y)=g\_c(X,Y)-Dmn\_A\_F(X,Y)-Dmn\_B\_F(X,Y) \qquad (27)$$

In step S208, the optimization unit 303 optimizes the constraining condition information of region C. More specifically, the unit 303 minimizes the evaluation value I calculated by the evaluation unit 304. This evaluation value I is calculated from errors of images formed by convoluting the evaluation filter F_E to corrected image g_c' of region C and its binary image b_c. Note that the processing in step S208 is the same as that in step S204 described above (i.e., the flowchart in FIG. 16), and a repetitive description thereof will be avoided.

In step S208, final constraining condition information Dmn_C of region C is calculated. Note that Dmn_C is optimized to minimize errors with respect to data from which the low frequency components of Dmn_A and Dmn_B are subtracted, as given by equation (27). Therefore, the low frequency components of Dmn_A+Dmn_B and Dmn_C have an opposite phase relationship to each other.

In this case, the phase differences for respective spatial frequencies calculated from a cross spectrum between Dmn_A+Dmn_B and Dmn_C also show the same tendency as in FIG. 22 described above. Therefore, as can be seen from the above description, the relationship defined by formula (17) is satisfied.

In step S209, the low frequency components in the constraining condition information of regions A, B, and C are subtracted from original image D. That is, the aforementioned low-frequency opposite-phase conversion filter LPF_S is applied to constraining condition information Dmn_C of region C to calculate low frequency components Dmn_C_F of the constraining condition information of region C, as given by:

$$Dmn\_C\_F(X,Y)=Dmn\_C(X,Y)*LPF\_S \qquad (28)$$

Low frequency components Dmn_A_F, Dmn_B_F, and Dmn_C_F of the constraining condition information of regions A, B, and C are subtracted from original image g_d of region D to calculate corrected data g_d' of region D, as given by:

$$g\_d'(X,Y)=g\_d(X,Y)-Dmn\_A\_F(X,Y)-Dmn\_B\_F(X,Y)-Dmn\_C\_F(X,Y) \qquad (29)$$

In step S210, the optimization unit 303 optimizes the constraining condition information of region D. More specifically, the unit 303 minimizes the evaluation value I calculated by the evaluation unit 304. This evaluation value I is calculated from errors of images formed by convoluting the evaluation filter F_E to corrected image g_d' of region D and its binary image b_d. Note that the processing in step S210 is the same as that in step S204 described above (i.e., the flowchart in FIG. 16), and a repetitive description thereof will be avoided.

In step S210, final constraining condition information Dmn_D of region D is calculated. Note that Dmn_D is optimized to minimize errors with respect to data from which the low frequency components of Dmn_A, Dmn_B, and Dmn_C are subtracted, as given by equation (29). Therefore, the low frequency components of Dmn_A+Dmn_B+Dmn_C and Dmn_D have an opposite phase relationship to each other.

In this case, the phase differences for respective spatial frequencies calculated from a cross spectrum between Dmn_A+Dmn_B+Dmn_C and Dmn_D also show the same tendency as in FIG. 22 described above. Therefore, as can be seen from the above description, the relationship defined by formula (18) is satisfied.

In this way, the setting and calculation processes of the constraining condition information of regions A to D are complete. In this embodiment, the constraining condition information calculated in this way is stored in advance in the constraining condition information memory 109 for each color.

As described above, in this embodiment, the constraining condition information is set to realize an opposite phase relationship in a low frequency region and no correlation of phases in a high frequency region in the density distributions of predetermined regions. The reason why only low frequency components are set in opposite phase will be described below with reference to FIG. 23.

Figure 23:
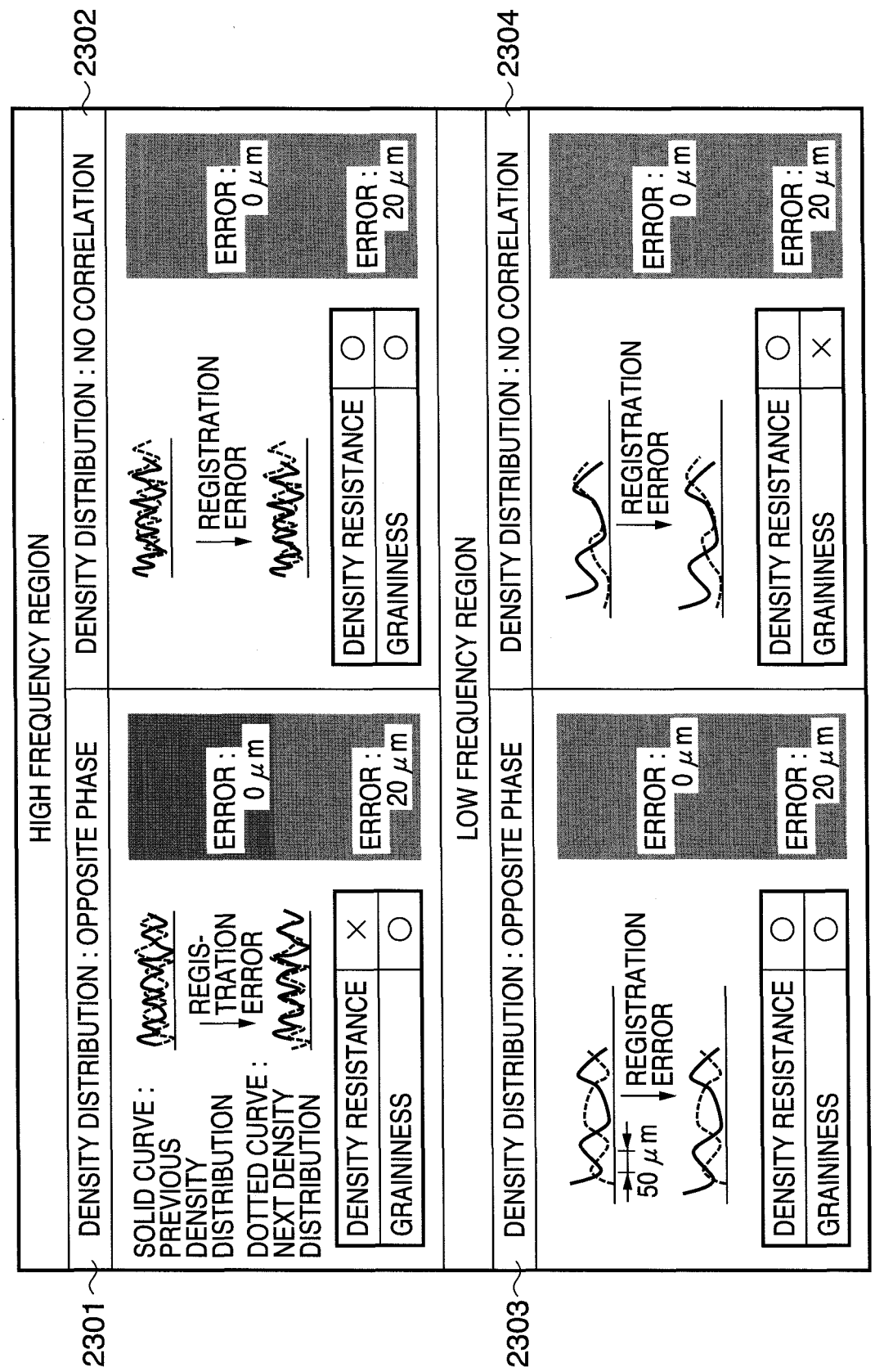
FIG. 23 shows anti-registration error characteristics depending on frequency regions of a printed image according to the embodiment of the present invention.

FIG. 23 shows changes of a printed image due to a registration error separately in a high frequency region and low frequency region. The high frequency region of a printed image will be examined first. When the density distributions at the scan numbers k and k+1 are in opposite phase, as denoted by reference numeral 2301, upper and lower peaks of the density distributions in case of no registration error are interpolated, and dots fill all over the sheet surface, thus hardly generating a sheet blank part. For this reason, the density becomes high. For example, when only a slight registration error (20 μm in FIG. 23) has occurred, the density distributions tend to overlap each other, and a sheet blank part is readily seen, resulting in a low density tendency. That is, when the density distributions of the high frequency components are in opposite phase, the density resistance against a registration error becomes low. However, when the density distributions of the high frequency components have no correlation, as denoted by reference numeral 2302, even when a slight registration error has occurred, the density hardly changes, and nearly no deterioration of graininess occurs.

On the other hand, as for a low frequency region of a printed image, when the density distributions are in opposite phase, as denoted by reference numeral 2303, low frequency components which are visually obstructive are reduced, and deterioration of graininess is suppressed. Furthermore, since the relationship between the upper and lower peaks of the distributions scarcely changes even when a registration error has occurred slightly, the density resistance is high. However, when the density distributions of the low frequency components have no correlation, as denoted by reference numeral 2304, since the low frequency components appear on an image irrespective of the occurrence of any registration error, the graininess deteriorates.

As described above, as can be seen from FIG. 23, in order to assure high density nonuniformity resistance and good graininess against a registration error on the printed image, it is important to attain the following two points between scans. That is, 1) low frequency components which are visually obstructive are set in opposite phase. 2) High frequency components are set to have no correlation in place of opposite phase.

For these reasons, in this embodiment, the constraining condition information values to be stored in advance in the constraining condition information memory 109 are set so that "low frequency components have an opposite phase relationship" and "high frequency components have no correlation" between the predetermined regions.

The reason why the relationships among the predetermined regions are determined as defined by formulas (16) to (18) in this embodiment will be described with reference to FIG. 11 taking region 1 in FIG. 5 as an example.

Paying attention to region 1 in FIG. 5, dots are formed in a first scan of the scan number k=1 using 3/4 to 4/4 nozzles from the upper end, and this part corresponds to region A in FIG. 11. Then, dots are formed in a second scan of the scan number k=2 using 2/4 to 3/4 nozzles from the upper end, and this part corresponds to region B in FIG. 11. That is, as an image formation order, region A in FIG. 11 is formed first, and region B is then formed. Hence, the values of regions A and B are set to have an opposite phase relationship in a low frequency region and have no correlation in a high frequency region, as defined by formula (16).

Dots are formed in a third scan of the scan number k=3 using 1/4 to 2/4 nozzles from the upper end, and this part corresponds to region C in FIG. 11. Hence, as an image formation order, after formation of regions A and B, region C is formed. Therefore, the total values of regions A and B and the values of region C are set to have an opposite phase relationship in a low frequency region and have no correlation in a high frequency region, as defined by formula (17).

Likewise, since dots are formed in a fourth scan, i.e., on region D, the total values of regions A, B, and C, and the values of region D are set to have an opposite phase relationship in a low frequency region and have no correlation in a high frequency region, as defined by formula (18).

Figure 24:
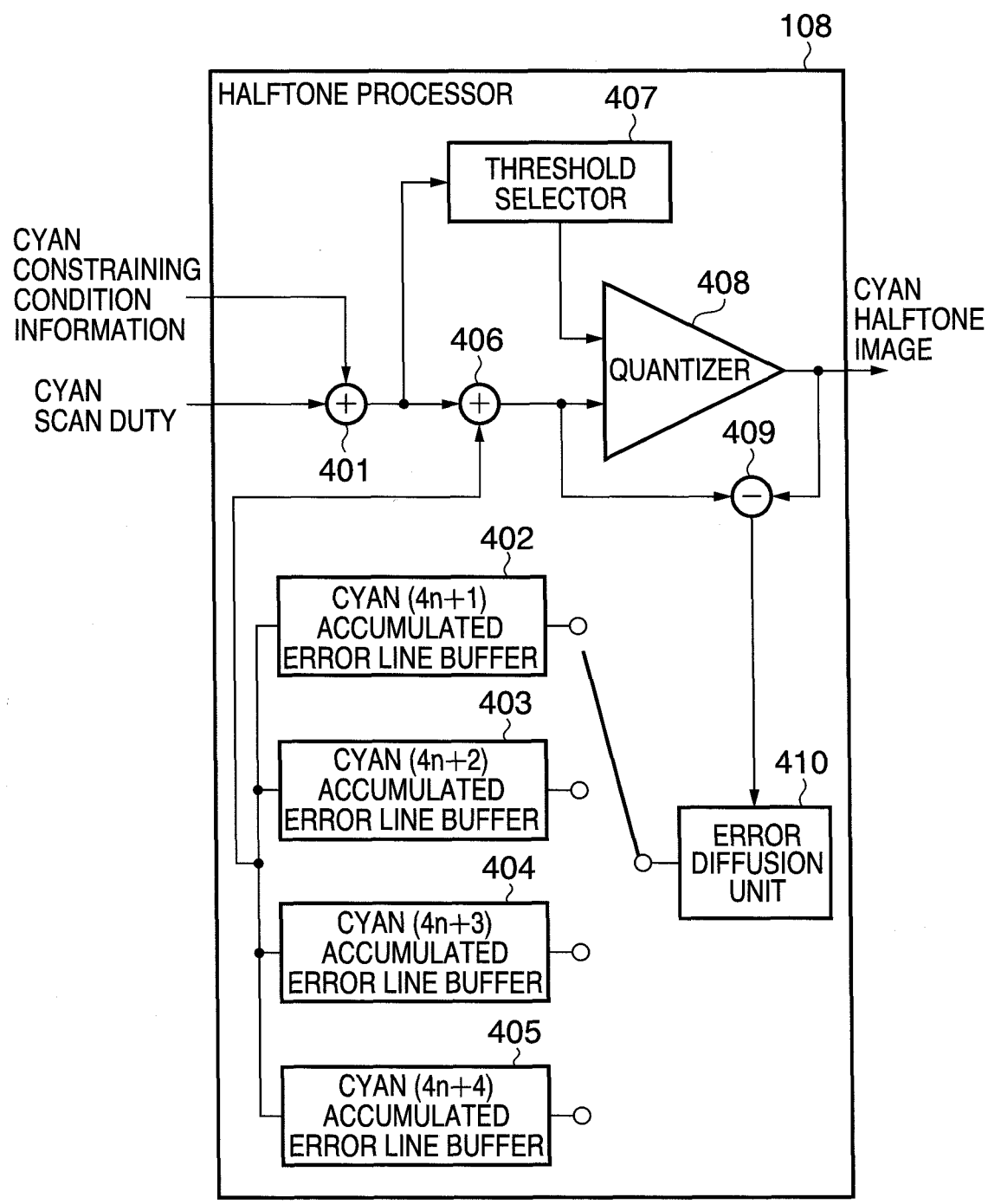
FIG. 24 is a block diagram showing the detailed arrangement of a halftone processor according to the embodiment of the present invention.

The halftone processing in step S106 based on the aforementioned constraining condition information will be described in detail below. The halftone processing of this embodiment uses a known error diffusion method as the processing for converting multi-valued input image data into a binary image (or an image having the number of tones equal to or larger than a binary value and smaller than the number of input tones). The halftone processing of this embodiment will be described in detail below with reference to the block diagram of FIG. 24, and the flowchart of FIG. 25. For the sake of simplicity, halftone processing of cyan in case of 4-pass printing and the scan number k=1 will be exemplified. FIG. 24 is a block diagram showing the detailed arrangement of the halftone processor 108, and FIG. 25 is a flowchart showing details of the halftone processing in the halftone processor 108.

Figure 25:
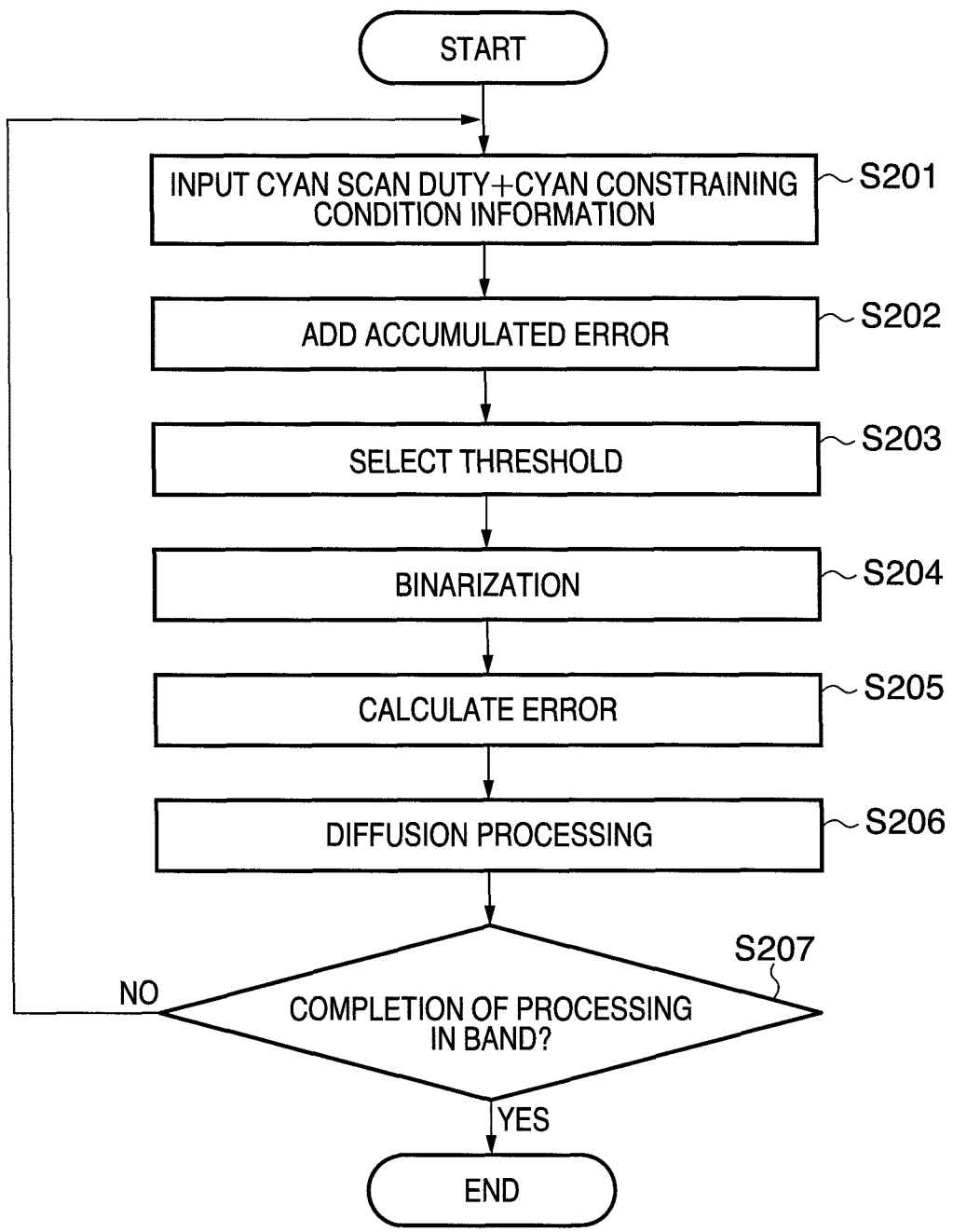
FIG. 25 is a flowchart showing the halftone processing according to the embodiment of the present invention.

In step S401 shown in FIG. 25, a total of the scan duty data and constraining condition information of cyan is input. That is, a constraining condition information adder 401 shown in FIG. 24 calculates total value data Ic of cyan scan duty C_d and cyan constraining condition information C_r by:

$$Ic = C\_d + C\_r \quad (30)$$

Note that the constraining condition information C_r includes all zeros when the scan number k=1.

In step S402, an accumulated error is added for error diffusion processing. The addition processing of an accumulated error will be described in detail below.

In this embodiment, assume that four coefficients K1 to K4 are set as error diffusion coefficients for the error diffusion processing, as shown in FIG. 26. For example, $K1=7/16$, $K2=3/16$, $K3=5/16$, and $K4=1/16$. However, the diffusion coefficients need not be fixed, as described above, but they may be changed according to tones (e.g., according to C_d) or more coefficients may be set in place of the four coefficients.

In order to diffuse and accumulate an error using these error diffusion coefficients, the halftone processor 108 assures four accumulated error line buffers 402 to 405 for cyan, and switches the accumulated error line buffer to be used for each scan number as follows:

"When the scan numbers k=1, 5, . . . , 4n+1 (n is an integer equal to or larger than 0)", use cyan (4n+1) accumulated error line buffer 402 "When the scan numbers k=2, 6, . . . , 4n+2", use cyan (4n+2) accumulated error line buffer 403 "When the scan numbers k=3, 7, . . . , 4n+3", use cyan (4n+3) accumulated error line buffer 404 "When the scan numbers k=4, 8, . . . , 4n+4", use cyan (4n+4) accumulated error line buffer 405

Figure 27:
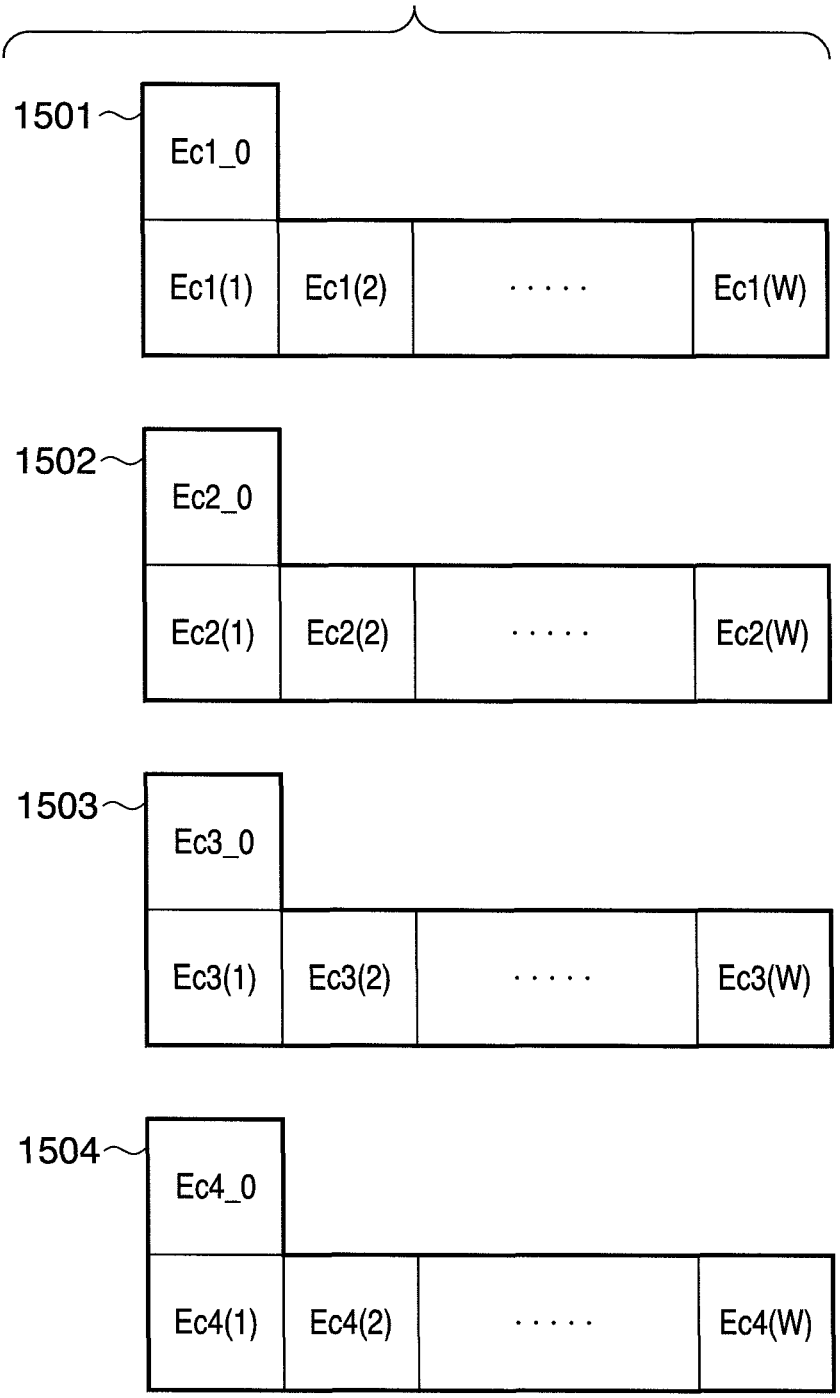
FIG. 27 shows storage areas of respective cyan accumulated error line buffers according to the embodiment of the present invention.

Note that the cyan accumulated error line buffers 402, 403, 404, and 405 respectively include four sets of storage areas 2701 to 2704 in FIG. 27, i.e., four sets "Ec1_0, Ec1(x)", "Ec2_0, Ec2(x)", "Ec3_0, Ec3(x)", and "Ec4_0, Ec4(x)". For example, the cyan (4n+1) accumulated error line buffer 402 has one storage area Ec1_0 and storage areas Ec1(x) (x=1 to W) as many as the number W of horizontal pixels of the input image. The cyan accumulated error line buffers 402, 403, 404, and 405 are initialized by an initial value "all zeros" only at the beginning of processing of the scan numbers k=1, 2, 3, and 4, respectively. For example, at the beginning of processing of the scan number k=5, the (4n+1) accumulated error line buffer 402 is not initialized.

In this embodiment, since the aforementioned four accumulated error line buffers are required per color, these buffers need to be prepared for six colors. That is, a total of 24 (=4×6) line buffers are required.

In this case, assume that the error diffusion processing is executed using the cyan (4n+1) accumulated error line buffer 402 so as to exemplify the halftone processing for the scan number k=1. That is, an accumulated error adder 406 adds an error Ec1(x) corresponding to a horizontal pixel position x of input pixel data to the input data value as the total of the scan duty and constraining condition information. That is, let Ic be input data of interest, and Ic' be data after addition of an accumulated error. Then, we have:

$$Ic'=Ic+Ec1(x) \tag{31}$$

In step S403, a threshold selector 407 selects a threshold T. The threshold T is set, for example, by:

$$T=128 \tag{32}$$

Alternatively, in order to avoid any dot generation delay, the threshold T may be finely changed according to C_d to reduce an average quantization error, as given by:

$$T=f(C\_d) \tag{33}$$

In step S404, a quantizer 408 compares the pixel data Ic' after error addition with the threshold T to determine Out_c as a binarization result of the dot. This rule is as follows.

When Ic'<T, $$Out\_c=0 \tag{34}$$

When Ic'≥T, $$Out\_c=255 \tag{35}$$

In step S405, an error calculation unit 409 calculates a difference Err_c between the pixel data Ic' obtained by adding an error to the pixel Ic of interest, and the output pixel value Out_c by:

$$Err\_c(x)=Ic'-Out\_c \tag{36}$$

In step S406, an error diffusion unit 410 diffuses an error. That is, the unit 410 executes diffusion processing of the error Err_c(x) according to the horizontal pixel position x using the cyan (4n+1) accumulated error line buffer 402 as follows:

$$Ec1(x+1) \leftarrow Ec1(x+1)+Err\_c(x) \times 7/16(x<W) \; Ec1(x-1) \leftarrow Ec1(x-1)+Err\_c(x) \times 3/16(x>1) \; Ec1(x) \leftarrow Ec1\_0+Err\_c(x) \times 5/16(1<x<W) \; Ec1(x) \leftarrow Ec1\_0+Err\_c(x) \times 8/16(x=1) \; Ec1(x) \leftarrow Ec1\_0+Err\_c(x) \times 13/16(x=W) \; Ec1\_0 \leftarrow Err\_c(x) \times 1/16(x<W)Ec1\_0 \leftarrow 0(x=W) \tag{37}$$

In this way, binarization (quantization value 0, 255) for one cyan pixel of the scan number k=1 is complete.

By repeating the aforementioned processes in steps S401 to S406 for addresses (0, 0) to (W-1, Nzzl-1) in the band (S407), the dot positions of halftone image data, i.e., ON/OFF of dots can be determined.

Figure 28:
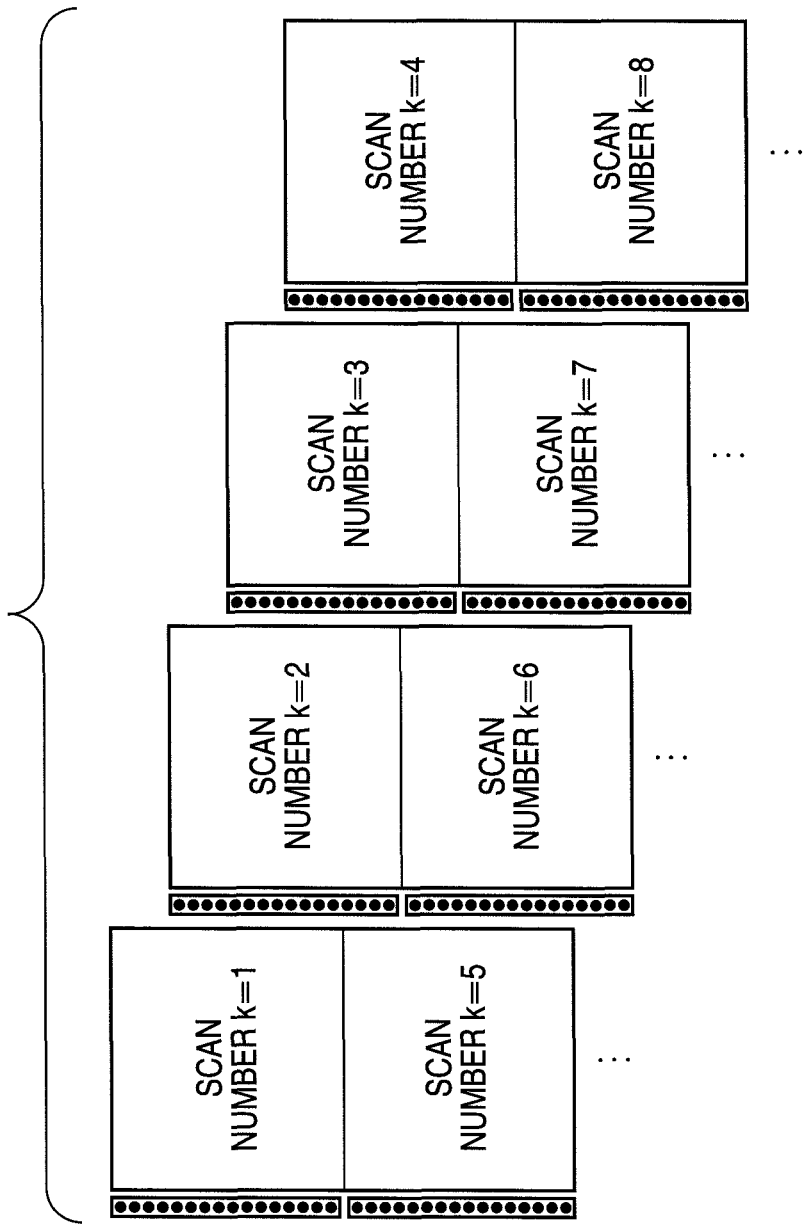
FIG. 28 shows a state of neighboring print regions according to the embodiment of the present invention.

Note that the processing for the scan number k=1 has been described above. For the scan numbers k=2 to 4, the halftone processing is executed using the cyan accumulated error line buffers 403 to 405, respectively. The processing for the scan number k=5 uses the same cyan (4n+1) accumulated error line buffer 402 as that for the scan number k=1 intact without initializing (substituting all zeros in) that buffer. This is because the preserved accumulated errors are applied intact to the lower neighboring region since the print regions of the scan numbers k=1 and 5 neighbor vertically, as shown in FIG. 28. If the cyan accumulated error line buffer 402 is initialized at k=5, errors are not preserved at the boundary that neighbors k=1, and dot continuity cannot be maintained.

Figure 29:
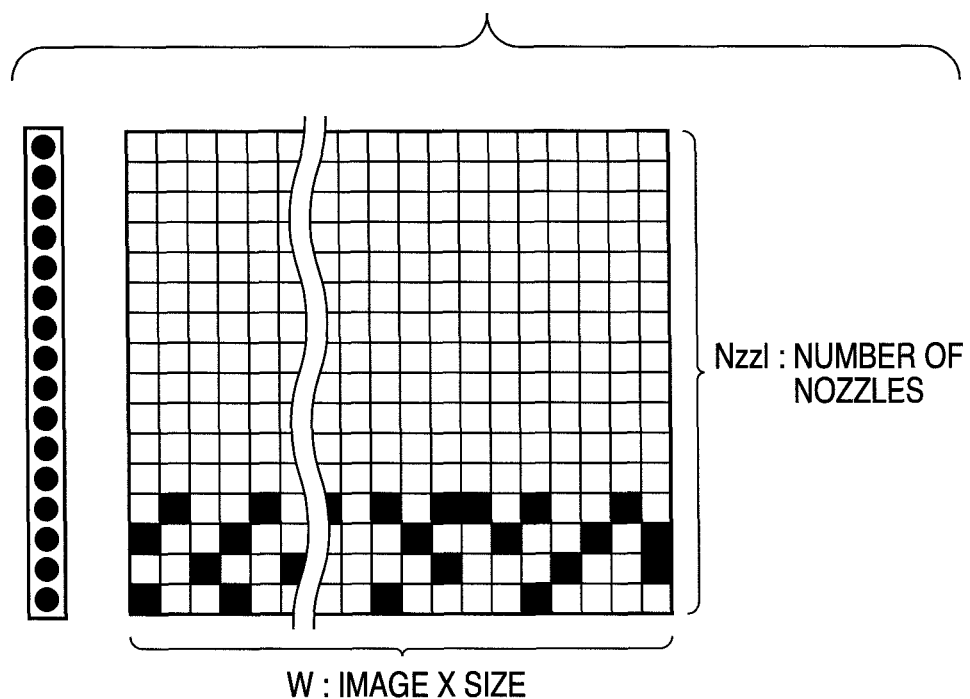
FIG. 29 shows a storage example of the halftone processing result according to the embodiment of the present invention.

Referring back to FIG. 3, upon completion of the halftone processing in step S106 as described above, the binary image data after the halftone processing is stored in the halftone image storage buffer 110 (S107). FIG. 29 shows the storage state of the halftone processing result of the scan duty values of the scan number k=1 in the halftone image storage buffer 110. As shown in FIG. 29, the halftone image storage buffer 110 stores binary image data for (the number of nozzles: Nzzl)×(image X size: W) corresponding to the pixel positions of the scan duty values.

With the above processing, the halftone processing for the scan number k=1 is complete. As a result, a binary image to be formed by a single head operation for each color is stored in the halftone image storage buffer 110 for each color.

Band data, which is stored in each halftone image storage buffer 110, and the vertical direction of which corresponds to the number of nozzles (Nzzl) and the horizontal direction of which corresponds to the X size (W) of the image, is output from the image output terminal 111 (S108).

In step S109 the printer 2 which received the halftone data selects ink colors that match the image data, and starts a print operation. In step S109, a main scan for printing an image on the printing medium by driving respective nozzles at a predetermined drive interval while moving the printing head 201 from the left to the right with respect to the printing medium is made once. Upon completion of the main scan, a sub-scan as a scan perpendicular to the main scan is made once.

It is then checked in step S110 if all scans are complete. If all scans are complete, a series of image forming processes are complete; otherwise, the process returns to step S103. As described above, all the processes are complete.

As described above, according to this embodiment, in a printing method that executes binarization processing for each main scan, the following effects are further obtained upon suppressing deterioration of graininess with respect to a registration error by providing high dispersiveness to the output dot allocations formed within a single main scan. That is, in the output dot allocations between a plurality of regions, by setting low frequency components in opposite phase, good graininess is assured irrespective of the presence/absence of the occurrence of a registration error. Furthermore, by providing randomness while reducing correlation for high frequency components, density nonuniformity due to a registration error can be eliminated.

More specifically, a dot pattern for each scan is formed by the error diffusion method so as to always set low frequency components of an identical color dot pattern, which is already printed, to be in opposite phase on an identical region on a printing medium. The constraining condition information to be referred to at that time is calculated by the genetic algorithm in advance to set low frequency components in opposite phase and high frequency components to have no correlation. That is, as given by equation (30), by reflecting the constraining condition information C_r to the input data C_d, the low frequency components are set in opposite phase, and high frequency components are set to have no correlation. In this way, a strong density nonuniformity resistance against any registration error on a printed image and good graininess can be assured.

Note that implementation of setting the low frequency components to be in opposite phase and the high frequency components to have no correlation is not limited to the method of this embodiment. As another method, the constraining condition information obtained by extracting low frequency components may be reflected to, e.g., a threshold or quantization error.

In the example of this embodiment, the error diffusion method is used as the halftone processing. Instead, a minimized average error method may be used.

In the above example, the constraining condition information is held in the constraining condition information memory 109. Alternatively, the constraining condition information may be held in the scan duty setting LUT 106.

Second Embodiment

The second embodiment according to the present invention will be described hereinafter. The first embodiment has exemplified a case in which the halftone processor 108 executes the error diffusion processing. The second embodiment will exemplify a case in which the dither matrix method is used in place of the error diffusion method. As described above, since the dither matrix method can speed up the processing compared to the error diffusion method, the second embodiment can attain high-speed processing. Furthermore, since the second embodiment uses the same constraining condition information as in the first embodiment, the same effects as those of the first embodiment can be obtained.

Figure 30:
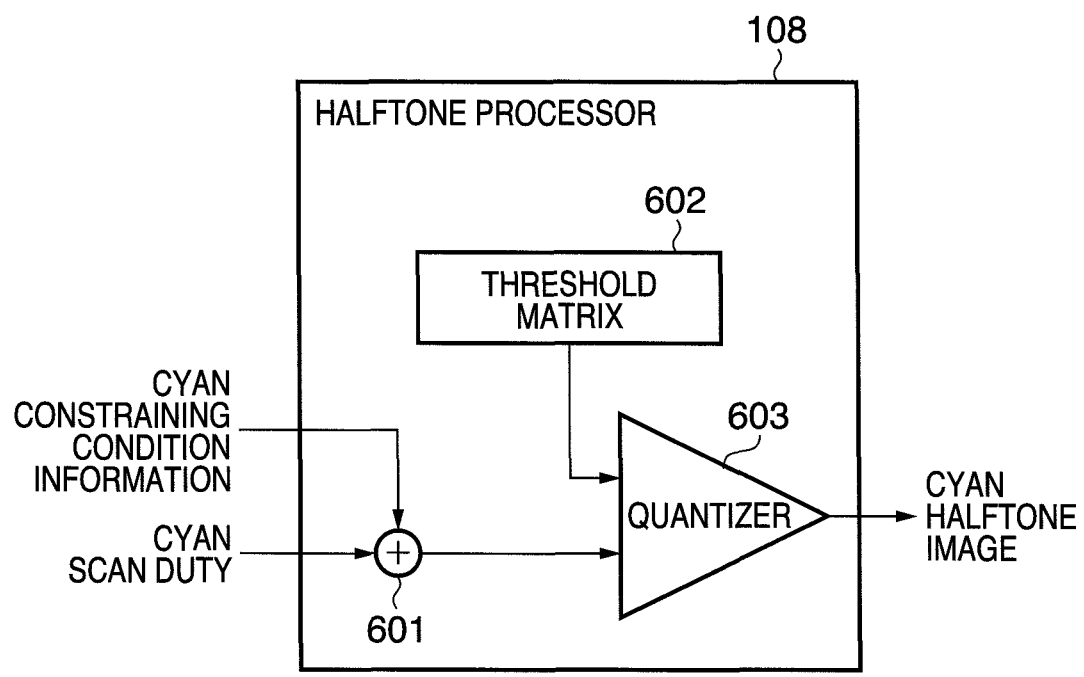
FIG. 30 is a block diagram showing the detailed arrangement of a halftone processor according to the second embodiment.

The detailed arrangement of the image forming apparatus of the second embodiment is the same as that in the first embodiment, except for the halftone processor 108. For the sake of simplicity, details of cyan halftone processing for 4-pass printing and the scan number k=1 as in the first embodiment will be described with reference to the block diagram of FIG. 30 and the flowchart of FIG. 31. FIG. 30 is a block diagram showing the detailed arrangement of the halftone processor 108 of the second embodiment, and FIG. 31 is a flowchart showing details of the halftone processing of the second embodiment.

Figure 31:
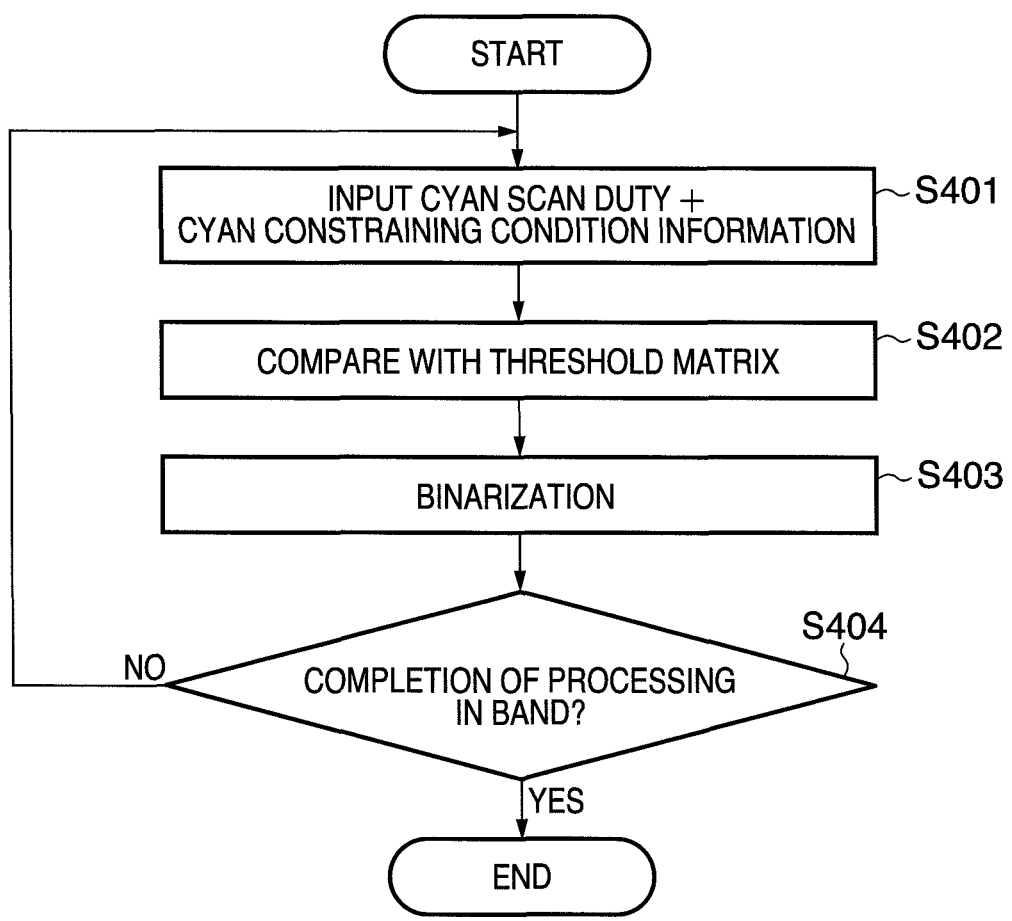
FIG. 31 is a flowchart showing the halftone processing according to the second embodiment.

In step S501 shown in FIG. 31, a constraining condition information adder 501 shown in FIG. 30 calculates total value data Ic of C_d as cyan scan duty data and C_r as cyan constraining condition information by:

$$Ic = C\_d + C\_r \tag{38}$$

Note that the constraining condition information C_r at the scan number k=1 includes all zeros.

A quantizer 503 compares I_c with a corresponding element value of a threshold matrix 502 in step S502, and outputs binary data in step S503. FIG. 32 shows an overview of binarization by the dither matrix processing of the second embodiment. As rules of binarization, element values Th (0 to 255) of the threshold matrix 502 are expressed as:

$$\text{When } I\_c \leq Th, \text{Out}\_c = 0 \tag{39}$$

$$\text{When } Th < I\_c, \text{Out}\_c = 255 \tag{40}$$

where Th is a threshold group corresponding to addresses on the printed image, as shown in FIG. 32.

As Th in the second embodiment, a known threshold matrix may be used. For example, a Bayer matrix, dot concentration type matrix, or blue noise mask matrix may be used. Also, the threshold matrix 502 may use different matrices for respective scan numbers or may always use an identical matrix.

In step S504, the halftone processor 108 repeats the aforementioned processes in steps S501 to S503 from addresses (0, 0) to (W-1, Nzzl-1) in a band, thus determining dot positions of halftone data. In this way, the halftone processing for the scan number k=1 is complete, and a binary image to be formed by a single head operation for each color is stored in the halftone image storage buffer 110 for each color.

As described above, according to the second embodiment, since the halftone processing is executed based on the dither matrix method in place of the error diffusion, the higher-speed processing can be attained compared to the first embodiment, and high-quality image formation having a resistance to any registration error can be implemented as in the first embodiment.

Other Embodiments

Each of the aforementioned embodiments has explained the image processing apparatus which uses the ink-jet printing method that forms an image by scanning the printing head having the plurality of nozzles, arranged in the predetermined direction, in a direction perpendicular to the arranging direction of the nozzles, and ejecting inks onto a printing medium. However, the present invention can be applied to printing apparatuses (for example, a thermal transfer method and electrophotography method) which execute printing according to methods other than the ink-jet method. In this case, the nozzles which eject ink droplets correspond to printing elements or laser light-emitting elements which print dots.

The present invention can also be applied to a so-called full-line type printing apparatus or the like, which has a printing head with a length corresponding to the printing width of a printing medium, and attains printing by moving the printing medium with respect to the printing head.

The present invention can adopt embodiments in the forms of a system, apparatus, method, program, storage medium (recording medium), and the like. More specifically, the present invention can be applied to either a system constituted by a plurality of devices (e.g., a host computer, interface device, image sensing device, web application, and the like), or an apparatus consisting of a single device.

Note that the present invention can also be achieved by directly or remotely supplying a program of software that implements the functions of the aforementioned embodiments to a system or apparatus, and reading out and executing the supplied program code by a computer of that system or apparatus. The program in this case is that corresponding to each illustrated flowchart in the embodiments.

Therefore, the program code itself installed in a computer to implement the functional processing of the present invention using the computer implements the present invention. Put differently, the present invention includes the computer program itself for implementing the functional processing of the present invention.

In this case, the form of program is not particularly limited, and an object code, a program to be executed by an interpreter, script data to be supplied to an OS, and the like may be used as long as they have the functions of the program.

As a recording medium for supplying the program, the following media can be used. For example, a Floppy® disk, hard disk, optical disk, magneto-optical disk, MO, CD-ROM, CD-R, CD-RW, magnetic tape, nonvolatile memory card, ROM, DVD (DVD-ROM, DVD-R), and the like can be used.

As a program supply method, the following method may be used. The user establishes a connection to a homepage on the Internet using a browser on a client computer, and downloads the computer program itself of the present invention (or a compressed file including an automatic installation function) from the homepage onto a recording medium such as a hard disk or the like. Also, the program code that forms the program of the present invention may be segmented into a plurality of files, which may be downloaded from different homepages. In other words, the present invention includes a WWW server which makes a plurality of users download a program file required to implement the functional processing of the present invention by the computer.

Also, a storage medium such as a CD-ROM or the like, which stores the encrypted program of the present invention, may be delivered to the user, and the user who has cleared a predetermined condition may be allowed to download key information used to decrypt the encrypted program from a homepage via the Internet. The user executes the encrypted program using the downloaded key information to install the program on a computer.

The functions of the aforementioned embodiments can be implemented when the computer executes the readout program. Furthermore, the functions of the aforementioned embodiments can be implemented when an OS or the like running on the computer executes some or all of actual processing operations on the basis of an instruction of that program.

Furthermore, the functions of the aforementioned embodiments can be implemented when the program read out from the recording medium is written in a memory equipped on a function expansion board or a function expansion unit, which is inserted in or connected to the computer, and is then executed. Therefore, a CPU equipped on the function expansion board or function expansion unit can execute some or all of actual processing operations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-023516, filed Feb. 1, 2007, which is hereby incorporated by reference herein in its entirety.

What is claimed is:

1. An image forming apparatus which forms, by a plurality of printing scans, an image on an identical region of a printing medium for each color component, the apparatus comprising:
   a printing head;
   an input unit adapted to input image data;
   a separation unit adapted to separate the input image data into scan data for each scan of the plurality of printing scans by separating a pixel value, for each pixel in the input image data, into each scan of the plurality of printing scans; and
   an N-ary unit adapted to generate a dot pattern formed by applying N-ary processing, N is an integer not less than 2, to the scan data obtained by the separation unit based on predetermined constraining condition information,
   wherein the predetermined constraining condition information is set so that low frequency components of the dot pattern generated by the N-ary unit are in opposite phase with respect to low frequency components of a dot pattern printed on the identical region of the printing medium, and
   wherein the separation unit separates the input image data based on a predefined duty division ratio.

2. The apparatus according to claim 1, wherein the constraining condition information is set so that high frequency components of the dot pattern generated by the N-ary unit have no correlation with respect to high frequency components of the dot pattern printed on the identical region of the printing medium.

3. The apparatus according to claim 1, wherein the constraining condition information is set by optimizing a predetermined image for each region which is printed by single printing scan.

4. The apparatus according to claim 3, wherein the optimization is done based on a genetic algorithm.

5. The apparatus according to claim 1, wherein the N-ary unit executes the N-ary processing based on an error diffusion method.

6. The apparatus according to claim 1, wherein the N-ary unit executes the N-ary processing based on a dither matrix method.

7. The apparatus according to claim 1, wherein the printing head is equipped for printing each of a plurality of colors.

8. The apparatus according to claim 1, further comprising a holding unit adapted to hold the predetermined constraining condition information.

9. An image processing apparatus which outputs a dot pattern to an image forming apparatus that forms, by a plurality of printing scans, an image on an identical region of a printing medium for each color component, the image processing apparatus comprising:
   an input unit adapted to input image data;
   a separation unit adapted to separate the input image data into scan data for each scan of the plurality of printing scans by separating a pixel value, for each pixel in the input image data, into each scan of the plurality of printing scans; and
   an N-ary unit adapted to generate a dot pattern formed by applying N-ary processing, N is an integer not less than 2, to the scan data obtained by the separation unit based on predetermined constraining condition information,
   wherein the predetermined constraining condition information is set so that low frequency components of the dot pattern generated by the N-ary unit are in opposite phase with respect to low frequency components of a dot pattern corresponding to the identical region of the printing medium, and
   wherein the separation unit separates the input image data based on a predefined duty division ratio.

10. The apparatus according to claim 9, wherein the constraining condition information is set so that high frequency components of the dot pattern generated by the N-ary unit have no correlation with respect to high frequency components of the dot pattern corresponding to the identical region of the printing medium.

11. A method of controlling an image forming apparatus which forms, by a plurality of printing scans, an image on an identical region of a printing medium for each color component, the method comprising:
   an input step of causing an input unit to input image data;
   a separation step of causing a separation unit to separate the input image data into scan data for each scan of the plurality of printing scans by separating a pixel value, for each pixel in the input image data, into each scan of the plurality of printing scans; and
   a generation step of causing an N-ary unit to generate a dot pattern formed by applying N-ary processing, N is an integer not less than 2, to the scan data obtained in the separation step based on predetermined constraining condition information, wherein the predetermined constraining condition information is set so that low frequency components of the dot pattern generated by the N-ary unit are in opposite phase with respect to low frequency components of a dot pattern printed on the identical region of the printing medium, and wherein the input image data is separated, in the separation step, based on a predefined duty division ratio.

12. The method according to claim 11, wherein the constraining condition information is set so that high frequency components of the dot pattern generated by the N-ary unit have no correlation with respect to high frequency components of the dot pattern printed on the identical region on the printing medium.

13. A non-transitory computer-readable storage medium storing a computer program for making a computer execute the method of controlling an image forming apparatus according to claim 11.

14. A method of controlling an image processing apparatus which outputs a dot pattern to an image forming apparatus that forms, by a plurality of printing scans, an image on an identical region of a printing medium for each color component, the method comprising:

an input step of causing an input unit to input image data;

a separation step of causing a separation unit to separate the input image data into scan data for each scan of the plurality of printing scans by separating a pixel value, for each pixel in the input image data, into each scan of the plurality of printing scans; and a generation step of causing an N-ary unit to generate a dot pattern formed by applying N-ary processing, N is an integer not less than 2, to the scan data obtained in the separation step based on predetermined constraining condition information, wherein the predetermined constraining condition information is set so that low frequency components of the dot pattern generated by the N-ary unit are in opposite phase with respect to low frequency components of a dot pattern corresponding to the identical region of the printing medium, and wherein the input image data is separated, in the separation step, based on a predefined duty division ratio.

15. The method according to claim 14, wherein the constraining condition information is set so that high frequency components of the dot pattern generated by the N-ary unit have no correlation with respect to high frequency components of the dot pattern already printed on the identical region of the printing medium.

16. A non-transitory computer-readable storage medium storing a computer program for making a computer execute the method of controlling an image processing apparatus according to claim 14.

17. An image processing apparatus which outputs a dot pattern to an image forming apparatus that forms, by a plurality of printing scans, an image on an identical region of a printing medium for each color component, the apparatus comprising:

an input unit adapted to input image data;

a separation unit adapted to separate the input image data into scan data for each scan of the plurality of printing scans by separating a pixel value, for each pixel in the input image data, into each scan of the plurality of printing scans; and an N-ary unit adapted to generate a dot pattern formed by applying N-ary processing, N is an integer not less than 2, to the scan data obtained by the separation unit, wherein the N-ary unit generates the dot pattern so that low frequency components of the dot pattern are in opposite phase with respect to low frequency components of a dot pattern corresponding to the identical region of the printing medium, and wherein the separation unit separates the input image data based on a predefined duty division ratio.

18. The apparatus according to claim 17, wherein the N-ary unit generates the dot pattern so that high frequency components of the dot pattern generated by the N-ary unit have no correlation with respect to high frequency components of the dot pattern printed on the identical region of the printing medium.

19. A method of controlling an image processing apparatus which outputs a dot pattern to an image forming apparatus that forms, by a plurality of printing scans, an image on an identical region of a printing medium for each color component, the method comprising:

an input step of causing an input unit to input image data;

a separation step of causing a separation unit to separate the input image data into scan data for each scan of the plurality of printing scans by separating a pixel value, for each pixel in the input image data, into each scan of the plurality of printing scans; and a generation step of causing an N-ary unit to generate a dot pattern formed by applying N-ary processing, N is an integer not less than 2, to the scan data obtained in the separation step, wherein the dot pattern is generated by the N-ary unit, in the generation step, so that low frequency components of the dot pattern are in opposite phase with respect to low frequency components of a dot pattern corresponding to the identical region of the printing medium, and wherein the input image data is separated, in the separation step, based on a predefined duty division ratio.

20. An image processing apparatus which outputs a dot pattern to an image forming apparatus that forms, by a plurality of printing scans, an image on an identical region of a printing medium for each color component, the apparatus comprising:

an input unit adapted to input image data;

a separation unit adapted to separate the input image data into scan data for each scan of the plurality of printing scans by separating a pixel value, for each pixel in the input image data, into each scan of the plurality of printing scans; and an N-ary unit adapted to generate a dot pattern formed by applying N-ary processing, N is an integer not less than 2, to the scan data obtained by the separation unit, wherein the N-ary unit generates the dot pattern so that a part of frequency components of the dot pattern are in opposite phase with respect to a part of frequency components of a dot pattern corresponding to the identical region of the printing medium, and wherein the separation unit separates the input image data based on a predefined duty division ratio.

21. The apparatus according to claim 20, wherein the N-ary unit generates the dot pattern so that another part of frequency components of the dot pattern generated by the N-ary unit has no correlation with respect to another part of frequency components of the dot pattern printed on the identical region of the printing medium.

22. The apparatus according to claim 21, wherein the N-ary unit generates the dot pattern based on predetermined constraining condition information indicating whether or not a dot is easily formed at an address on an image.

23. A method of controlling an image processing apparatus which outputs a dot pattern to an image forming apparatus that forms, by a plurality of printing scans, an image on an identical region of a printing medium for each color component, the method comprising:

an input step of causing an input unit to input image data;

a separation step of causing a separation unit to separate the input image data into scan data for each scan of the plurality of printing scans by separating a pixel value, for each pixel in the input image data, into each scan of the plurality of printing scans; and a generation step of causing an N-ary unit to generate a dot pattern formed by applying N-ary processing, N is an integer not less than 2, to the scan data obtained in the separation step, wherein the dot pattern is generated, in the generation step, so that a part of frequency components of the dot pattern are in opposite phase with respect to a part of frequency components of a dot pattern corresponding to the identical region of the printing medium, and wherein the input image data is separated, in the separation step, based on a predefined duty division ratio.

* * * * *